United States Patent [19]

Ikeno

[11] Patent Number: 5,452,113
[45] Date of Patent: Sep. 19, 1995

[54] COLOR DISPLAY ELEMENT HAVING PDLC LAYERS AND COLOR FILTER

[75] Inventor: Hidenori Ikeno, Tokyo, Japan

[73] Assignee: NEC Corporation, Tokyo, Japan

[21] Appl. No.: 901,206

[22] Filed: Jun. 19, 1992

[30] Foreign Application Priority Data

Jun. 21, 1991 [JP] Japan .................. 3-149130
Aug. 6, 1991 [JP] Japan .................. 3-195597

[51] Int. Cl.⁶ .......................................... G02F 1/1333
[52] U.S. Cl. ........................................ 359/53; 359/51;
     359/67; 359/92; 359/68
[58] Field of Search .................... 359/51, 52, 53, 67,
     359/68, 92, 99, 70, 98; 345/88, 50

[56] References Cited

U.S. PATENT DOCUMENTS

| 4,581,608 | 4/1986 | Aftergut et al. | 359/51 |
| 4,693,560 | 9/1987 | Wiley | 359/53 |
| 4,944,576 | 7/1990 | Lacker et al. | 359/51 |
| 5,132,815 | 7/1992 | Fergason | 359/53 |
| 5,194,973 | 3/1993 | Isogai et al. | 359/51 |
| 5,223,959 | 6/1993 | Wu et al. | 359/51 |
| 5,283,563 | 2/1994 | Allen et al. | 359/53 |
| 5,296,952 | 3/1994 | Takatsu et al. | 359/53 |

OTHER PUBLICATIONS

Reflective Multicolor LCD (I): Consideration of the Color Purity and Brightness, Proceedings of the SID, vol. 29/2, 1988, pp. 151–155.
Reflective Multicolor LCD (II): Improvement in the Brightness, Proceedings of the SID, vol. 20/2, 1988, pp. 157–160.
Reflective Multicolor Liquid-Crystal Display, IEEE Transactions on Electron Devices, vol. Ed-33, No. 8, Aug. 1986, pp. 1207–1211.
P. 2.2 Evaluation of Brightness and Contrast of Twisted Nematic and Guest-Host Cells, Japan Display 83, pp. 312–315.
Nematic Droplet/Polymer Films for Highcontrast Coloured Reflective Displays, Displays, Jan. 1991, pp. 2–14.
P. 2.4 Reflective Multicolor Liquid Crystal Display with Micro-Color Filters, Japan Display '86, pp. 312–315.

Primary Examiner—William L. Sikes
Assistant Examiner—Tai V. Duong
Attorney, Agent, or Firm—Sughrue, Mion, Zinn, Macpeak & Seas

[57] ABSTRACT

A color display element comprising a first substrate, a first electrode, a first dimmer layer in which light-scattering and transparent states can be controlled by an external electric field, a color filter, a second dimmer layer in which light-scattering and transparent states can be controlled by an external electric field, and a second substrate, each disposed in the above order as viewed from the side from which light enters, a light-absorbing layer being provided behind said second dimmer layer as viewed from the side from which light enters to absorb the light which passes through said first dimmer layer, color filter and second dimmer layer.

23 Claims, 9 Drawing Sheets

COLOR DISPLAY ELEMENT HAVING PDLC LAYERS AND COLOR FILTER

BACKGROUND OF THE INVENTION

1. Field of the Invention

The present invention relates to a color display element and a method for driving the same.

2. Description of the Prior Art

In arranging a reflecting-type liquid crystal display which eliminates the use of a backlight, in order to provide a natural appearance, it is an essential requirement that a polarizing plate not be used and that only the natural light incident into a liquid crystal element from the outside be used. In order to achieve such a display, it is desirable to use a guest host type or light scattering type display system. Among these, a reflective type liquid crystal panel using a dimmer of the above-described guest host type is arranged as shown in FIG. 1A. That is, in a color liquid crystal panel of this system, a color filter 2 is provided on the surface of one transparent substrate 1 to determine the spectrum of transmitted light, and a transparent electrode 3 is formed on the color filter 2. On the other substrate 7, a transparent electrode 5 and a light reflecting layer 6 are laminated. A liquid crystal is encapsulated within the gap formed between transparent electrodes 3 and 5 to form a dimmer layer 4. Not only are transparent electrode 5 and light reflecting layer 6 are separately formed, but also the former may also serve as a light reflecting layer to form a metal reflecting mirror. As a liquid crystal display device having such an arrangement, one using a black dyestuff guest host type liquid crystal as the dimmer layer 4 is disclosed in Eurodisplay '87 speech No. P2.4. In this arrangement, incident light passing through the transparent substrate 1 passes through color filter 2, transparent electrode 3, dimmer layer 4 and transparent substrate 5 to be reflected by light reflecting layer 6, which reflected light is then emitted from transparent substrate 1 to the outside along the path opposite the path described above. If light which has followed such a path has passed through a red color filter, it will appear red when seen from the outside because it is emitted from transparent substrate 1 to the outside with a red spectrum. Therefore, a display having this arrangement allows a color display.

Another reflecting color display with the arrangement as illustrated in FIG. 1B employs transparent electrode 3 which is formed on the surface of transparent substrate 1. On another substrate 7, transparent electrode 5, color filter 2 to determine the spectrum of the transmitted light, and light reflecting layer 6 are laminated. A liquid crystal is encapsulated into the gap between these transparent electrodes 3 and 5 to form dimmer layer 4. Incidentally, the order in which transparent electrode 5 and light reflecting layer 6 are disposed is not necessarily restricted to the one illustrated in FIG. 1B, and there are also cases in which their functions are integrated. An example of a liquid crystal color display having such an arrangement in which dimmer layer 4 is arranged by using a black dyestuff guest host polymer dispersed liquid crystal (PDLC) is described in the January 1991 issue of the journal DISPLAY on page 2. In this liquid crystal color display, incident light which passes through transparent substrate 1 passes through transparent electrode 3, dimmer layer 4, transparent electrode 5, and color filter 2 to be reflected against light reflecting layer 6, following which the reflected light travels along the path opposite the above path to be emitted from transparent substrate 1 to the outside. If passed through a red filter, this light will appear red when seen from the outside because it is emitted from transparent substrate 1 to the outside with a red spectrum. Therefore, a display element having this arrangement also allows a color display.

There is an additional example of a reflective monochrome display shown in FIG. 1C in which transparent electrode 3 is formed on the surface of transparent substrate 1, and transparent electrode 5 and light absorbing layer 8 are laminated on the other substrate 7. Liquid crystal is sandwiched between these transparent electrodes 3 and 5 to form dimmer layer 4. A display having a dimmer layer using polymer dispersed liquid crystal (PDLC) is disclosed in 13th International Liquid Crystal Conference, speech number APP-34P-P-Tue. In this arrangement, incident light passing through transparent substrate 1 passes through transparent electrode 3, and, if dimmer layer 4 is transparent, continues through dimmer layer 4 and transparent electrode 5 to be absorbed by a light-absorbing layer 8 with the result that a black display is obtained. If dimmer layer 4 scatters light, then the incident light passing through transparent substrate 1 passes through transparent electrode 3 to enter dimmer layer 4. Since dimmer layer 4 is light-scattering, the incident light is then scattered with some of the light passing back through transparent electrode 3 and transparent substrate 5 to be emitted to the outside. The remainder of the scattered light passes through transparent electrode 5 to be absorbed by light-absorbing layer 8 and is not reflected. As a result, when seen from the outside, the light appears white and a white display is obtained. As described above, the display illustrated in FIG. 1C enables a monochrome display depending on whether dimmer layer 4 is transparent or light-scattering.

A conventional reflective liquid crystal color display has an arrangement in which color filter 2 is disposed in front of dimmer layer 4 (FIG. 1A) or behind dimmer layer 4 (FIG. 1B). Therefore, in the displays illustrated in FIGS. 1A and 1B, since dimmer layer 4 changes between black state and transparent state, if black display and color display are desired, there will be no major problem regarding the quality of the display. However, if white display is desired, since the light incident into the color display all passes through the color filter and at least two thirds of that light energy is lost, a perfectly white display will not be obtained. A gray display is considered sufficient for monochrome display. If dimmer layer 4 is switched between the transparent state and the light-scattering state as shown in FIGS. 1A and 1B, it is possible to achieve a color display when dimmer layer 4 is transparent, but if dimmer layer 4 is in the light-scattering state as in FIG. 1A, the incident light must pass through color filter 2, resulting in a gray display which achieves neither a white or black display. In the case of FIG. 1B, the scattered light is emitted from transparent substrate 1 to the outside, as it is, resulting in a white display, in which case, a black display cannot be achieved. Further, in the display of FIG. 1C, while it is possible to achieve a monochrome display, a color display cannot be achieved.

SUMMARY OF THE INVENTION

An object of the present invention is to provide a reflective color display element high in display quality which allows color display and high-contrast monochrome display in the same pixel, a feature which has been impossible in the above-described conventional reflective displays.

A first color display element according to the present invention comprises a first substrate, a first electrode, a first dimmer layer in which light-scattering state and transparent state can be controlled by an external electric field, a color filter, a second dimmer layer in which light-scattering state and transparent state can be controlled by an external electric field, a second electrode and a second substrate provided in the same successive order as viewed from the light incident side, and a light-absorbing layer behind the second dimmer layer as viewed from the light incident side to absorb the light passing through the first substrate, the first electrode, the first dimmer layer, the color filter and the second dimmer layer.

The first and second dimmer layers may be switched between the light-scattering state and the transparent state by applying an electric field, in which case, it is possible to utilize, for example, a DSM system produced by a polymer dispersed liquid crystal (PDLC) or nematic liquid crystal, a DSM system in a smectic A layer, a scattering-transparency change by a ferroelectric liquid crystal, and a scattering state in the focal conic tissue of a cholesteric layer. In this polymer dispersed liquid crystal (PDLC), the liquid crystal material may be dispersed within a set substance, or the set substance may be present in the form of a three-dimensional network within the liquid crystal material.

The first dimmer layer and the second dimmer layer may be sandwiched by the substrates. That is, as shown in FIG. 2B, liquid crystal cells 21 and 23 may sandwich color filter 22 therebetween. Liquid crystal cells 21 and 23 are, as shown in FIG. 2A, each composed of a transparent electrode 17, 19 and a dimmer layer 18 sandwiched between transparent electrodes 17 and 19, these three layers in turn being sandwiched between transparent substrates 16 and 20. However, as illustrated in FIG. 3, if either one or both of the first dimmer layer 27 and second dimmer layer 29 is a liquid crystal in a self-supporting solid form, such as polymer dispersed liquid crystal (PDLC), the number of substrates can be decreased to increase the light-transmitting factor.

The transparent electrode may be extremely low in light-absorption factor in the visible light area such as ITO or the like, and may be electrically conductive. In addition, the transparent electrode may be formed on the substrate uniformly, in the form of a specific pixel, or in the form of a strip of paper on the upper and lower substrates. An active element such as a transistor or diode may be added to each pixel.

The particular color of the color filter may be individually displayed or may be partially divided into three primary colors for display in a mixed color.

A substrate may be used which allows light in the visible light area to be transmitted, such as a glass substrate or a polyethylene telephthalate (PET) film.

The light-absorbing layer may be provided between the second dimmer layer and the second electrode, between the second electrode and the second substrate, or below the second substrate. In addition, the light-absorbing layer may be used as the substrate. If the light-absorbing layer is located above the second substrate, the substrate need not be transparent and may take the form of an opaque substrate such as metal, semiconductor, plastic, or the like. Similarly, if the light-absorbing layer is located above the second electrode, the electrode need not be transparent.

This color display element is driven in the following manner. If black is to be displayed, the first and the second dimmer layers are both made transparent. If color is to be displayed, the first dimmer layer is made transparent and the second dimmer layer is made light-scattering. If white is to be displayed, the first dimmer layer is made light-scattering, and the second dimmer layer may be light-scattering or transparent.

If each dimmer layer is individually sandwiched by electrode-attached substrates, the above-described driving method can be easily realized by independently controlling each dimmer layer.

If a polymer dispersed liquid crystal (PDLC) is used for each dimmer layer and the two dimmer layers are controlled by sandwiching them between a pair of electrodes, it is possible to achieve the object with an element having the characteristics shown in FIGS. 4A through 4D. In FIGS. 4A through 4D, the broken line 14A indicates light-scattering characteristics of the first dimmer layer, and solid line 15A indicates light-scattering characteristics of the second dimmer layer.

Referring to FIG. 4A, the first dimmer layer exhibits a light-scattering state when no voltage is applied and switches to a transparent state when voltage above a predetermined threshold level is applied. The second dimmer layer exhibits a transparent state when no voltage is applied and switches to a light-scattering state when voltage above a predetermined threshold level which is greater than that of the first dimmer layer is applied. As a result, if the applied voltage is gradually increased from zero, the display changes from white to black and then to color, as shown.

Referring to FIG. 4B, the first and second dimmer layers exhibits a light-scattering state when no voltage is applied to either the first or second dimmer layers, and switches to a transparent state when voltage above a predetermined threshold level is applied. If the threshold level of the first dimmer layer is made smaller than that of the second dimmer layer, the display changes from white to color and then to black as the applied voltage increase.

FIGS. 4C and 4D illustrate cases in which the characteristics of the first and second dimmer layers differ from those shown in FIGS. 4A and 4B.

For example, the color display element exhibiting the characteristics of FIG. 4A employs a liquid crystal positive in anisotropy of the dielectric constant as the first dimmer layer and a liquid crystal taking positive or both positive and negative anisotropic values of the dielectric constant as the second dimmer layer. The liquid crystal of the second dimmer layer is oriented so that it becomes transparent when no voltage is applied. In order to form the second dimmer layer, light may be irradiated onto a mixed solution of a liquid crystal material which may take a negative or both positive and negative anisotropic values of the dielectric constant, and a photo-setting compound with either the electric field or the magnetic field or both applied setting.

In order to obtain a color display element exhibiting the characteristics of FIG. 4B, a liquid crystal with positive in anisotropy of the dielectric constant is used. The threshold voltage level of the liquid crystal is lowered by increasing the anisotropy of the dielectric value $\Delta\epsilon_1$ of the liquid crystal component of the first dimmer layer to a level greater than that $\Delta\epsilon_2$ of the liquid crystal composition of the second dimmer layer.

If the polymer dispersed liquid crystal (PDLC) is used as the dimmer layer, the dimmer layer may be prepared in accordance with the following method:

A mixed solution of the photo-setting compound and liquid crystal material is applied to the substrate on which the electrode is formed according to a thin-film forming method such as a screen printing, offset printing, letterpress printing, intaglio printing, spin coating, or the like, and is set by irradiating with light to form the dimmer layer. The above-mentioned printing methods may be used to form the color filter on this layer, or a dying method, pigment printing method, photolithographic method, or the like may alternatively be used.

With the first color display element of the present invention, it is possible to achieve monochrome or color display depending on whether the second dimmer layer is light-scattering or transparent.

Next, the operation of the first color display element according to the present invention is described with reference to FIGS. 4A through 4D and 5.

A structural feature of the first color display element of the present invention lies in the disposition of the color filter 10 between the first and second dimmer layers 9 and 11 and the provision of a light-absorbing layer 12A on the side opposite the direction 13 from which natural light enters. Roughly, four combinations of this arrangement are conceivable depending on whether the first and second dimmer layers 9 and 11 lying above and below color filter 10 exhibit a light-scattering state or a transparent state.

(1A) The first and second dimmer layers 9,11 are both transparent.

(2A) The first dimmer layer 9 is transparent and the second dimmer layer 11 is light-scattering.

(3A) The first dimmer layer 9 is light-scattering and the second dimmer layer 11 is transparent.

(4A) The first and second dimmer layers are both light-scattering.

The operation of each case will now be described.

In case (1A), since the first and second dimmer layers 9 and 11 are both transparent, the incident light passes through first dimmer layer 9, color filter 10 and second dimmer layer 11 to reach light-absorbing layer 12. Light-absorbing layer 12 prevents the light from being reflected, with the result that black is displayed.

In case (2A), since the first dimmer layer 9 is transparent, light passes through the first dimmer layer 9 to enter color filter 10. The light passing through color filter 10 is scattered against second dimmer layer 11, and most of the light passes through color filter 10 and first dimmer layer 9 again to be emitted to the outside the element. Of the light scattered against second dimmer layer 11, light passing through second dimmer layer 11 is absorbed by light-absorbing layer 12A and is not reflected. As a result, a color peculiar to color filter 10 is displayed.

In case (3A), since first dimmer layer 9 scatters light, most of the incident light is scattered and is emitted to outside the element. On the other hand, since second dimmer layer 11 is transparent, some of the light which passes through first dimmer light 9 passes through color filter 10 and second dimmer layer 11 and is finally absorbed in light-absorbing layer 12A. As a result, since the only light emitted to the outside is the light scattered against first dimmer layer 9, white is displayed.

In case (4A), since the first and second light-scat layers 9 and 11 both scatter light, the incident light is scattered against first dimmer layer 9 as well as against second dimmer layer 11. In this case, although the light scattered against first dimmer layer 9 is considered to be white, since the light scattered against second dimmer layer 11 has passed through color filter 10, it exhibits a particular color. Therefore, the emitted light exhibits an achromatic color, although with a certain degree of saturation. However, if the color disposition of color filter 10 is dense and there is no discernible dispersion of the wavelength in the reflected light of second dimmer layer 11, it is considered that white is displayed.

As described above, four combinations can be conceived according to the various combinations of the transparent state and light-scattering state of the first and second layers 9 and 11. However, since the same white is displayed in case (3A) and (4A), the actually realizable selection of combinations is either (1A)-(2A)-(3A) or (1A)-(2A)-(4A).

If a driving electrode corresponds to each of first and second dimmer electrodes 9 and 11, the above-described combination may be realized according to the driving mode of each liquid crystal.

If the first and second dimmer layers 9 and 11 are both sandwiched between a pair of electrodes and have no electrode, the first and second dimmer layers 9, 11 may be controlled as shown in FIGS. 4A through 4D.

FIG. 4A illustrates the relationship between the applied voltage and the light scattering degree in the case of (1A)-(2A)-(3A). Here, a liquid crystal with a dielectric constant of positive anisotropy is used in the first dimmer layer to drive in the normal mode. In the second dimmer layer, a liquid crystal with a dielectric constant of either negative or both positive and negative anisotropic values is used to drive in the reverse mode. As shown, if the threshold voltage level of the first dimmer layer is made smaller than-that of the second dimmer layer, the first dimmer layer will scatter light and the second dimmer layer will be transparent when no voltage is applied, in which case, white will be displayed. If voltage above the threshold voltage level of the first dimmer layer is applied, the first dimmer layer will become transparent and black will be displayed. If the voltage is further increased to exceed the threshold voltage level of the second dimmer layer, the second dimmer layer will scatter light and color display becomes possible.

FIG. 4B illustrates the relationship between the applied voltage and light scattering degree in the case of (1A)-(2A)-(4A). Here, both the first and second dimmer layers are driven in the normal mode. As shown, if the threshold voltage level of the first dimmer layer is made smaller than that of the second dimmer layer, the first and second dimmer layers will both scatter light to allow a white display when no voltage is applied. If voltage above the threshold voltage level of the first dimmer layer is applied, the first dimmer layer will become transparent, allowing a color display. If the applied voltage is further increased to exceed the threshold voltage level of the second dimmer layer, the second dimmer layer will also become transparent and black display becomes possible.

FIG. 4C illustrates the relationship between the applied voltage and light scattering degree in the case of (1A)-(2A)-(3A). Here, a crystal with a dielectric constant of negative or both positive and negative anisotropy values is used in the first dimmer layer to drive in the reverse mode. In the second dimmer layer, a crystal liquid with a dielectric constant of positive anisotropy is used to drive in the normal mode. As shown, if the threshold voltage level of the first dimmer layer is greater than that of the second dimmer layer, the first dimmer layer will also become transparent and the second dimmer layer will scatter light when no voltage is applied, and this will allow the element to display color. If the voltage above the threshold voltage level of the second dimmer layer is applied, the second dimmer layer will become transparent and black display becomes possible. If the applied voltage is further increased to exceed the threshold voltage level of the first dimmer layer, the first dimmer layer will switch to a light-scattering state and white display becomes possible.

FIG. 4D illustrates the relationship between the applied voltage and light scattering degree in the case of (1A)-(2A)-(3A). Here, both the first and second dimmer layers are driven in the reverse mode. As shown, if the threshold voltage level of the first dimmer layer is made greater than that of the second dimmer layer, both the first and second dimmer layers will become transparent to allow black to be displayed when no voltage is applied. If voltage above the threshold voltage level of the second dimmer layer is applied, the second dimmer layer will switches to a light-scattering state and color display becomes possible. If the applied voltage is further increased to exceed the threshold voltage level of the first dimmer layer, the first dimmer layer will also switches to a light-scattering state and white display becomes possible.

An element of reverse mode is prepared in the following manner. Light is irradiated to set a mixed solution of a liquid crystal material which can have a dielectric constant of either negative or both positive and negative anisotropy and of a photo-setting compound with at least one of an electric field and a magnetic field applied. This process forms a dimmer layer that may become transparent. If the photo-setting compound is set with liquid crystal molecules oriented so as to become transparent when an electric field or a magnetic field is applied, the liquid crystal molecules will not be able to return to a random state once the photo-setting compound is set and will be fixed due to the anchoring of the interface even if the electric field or the magnetic field is removed. This state cannot be changed for a liquid crystal with a dielectric of positive anisotropy but can be changed to a light-scattering state in the case of liquid crystals which can take negative values of anisotropy.

For example, let us assume that a liquid crystal is used in which the crossover frequency fc is 10 kHz and that the anisotropy of dielectric constant $\Delta\epsilon>0$ for frequencies below that value and, for that frequency, $\Delta\epsilon<0$. If the photo-setting compound is set with a voltage of low frequency below 10 kHz applied between the substrates, the direction in which the liquid crystal molecules are oriented is fixed perpendicular to the sub strates. Assuming that the light-transmitting state is transparent at this time, if the voltage of a frequency greater than 10 kHz is applied during operation, the crystal molecules will enter a light-scattering state.

In normal liquid crystal molecules having an aromatic ring such as a benzene ring, the anisotropy of dielectric constant $\Delta\epsilon$ can take any positive or negative value depending on its configuration, but the value of the magnetizing anisotropy $\Delta\chi$ can take only a positive value. Therefore, when using a liquid crystal with dielectric constant of negative anisotropy, if the photo-setting compound is set with a magnetic field which is sufficiently stronger than the Fredericks transition point of the liquid crystal and applied in a direction perpendicular to the substrate, the direction in which the crystal molecules are oriented will be fixed in the direction perpendicular to the substrate. Assuming that the light-transmitting state is transparent at this time, the molecules will enter a light-scattering state when voltage is applied during operation because they will change their orientation to become parallel to the substrate.

A second color display element according to the present invention comprises a first dimmer layer, a second dimmer layer in which light-absorbing and transparent states can be controlled by an external electric field, a second electrode and a second substrate provided in the same order as viewed from the side from which the light enters, and a light-reflecting layer for reflecting light passing through first and second dimmer layers is provided behind the second dimmer layer with a color filter disposed between the first dimmer layer and the light reflecting layer.

The first dimmer layer may be switched between the light-scattering state and the transparent state by applying an electric field and, in which case, it is possible to utilize, a DSM system using polymer dispersed liquid crystal (PDLC) or nematic liquid crystal, a DSM system in a smectic A layer, a system for switching between the light-scattering state and the transparent state by a ferroelectric liquid crystal, or the light-scattering state of a focal conic tissue in a cholesteric layer.

The second dimmer layer may be switched between the light-absorbing state and the transparent state by applying an electric field and, to this end, a guest-host liquid crystal obtained by mixing a dichroistic pigment with a liquid crystal for dispersion may be used. For example, a cholesteric liquid crystal and a monochrome dichroistic pigment may be mixed and an electric field be applied thereto to cause a nematic-cholesteric phase transition, or a dichroistic pigment may be mixed with a crystal component for dispersion and the resulting matter be further dispersed into high molecules to produce a polymer dispersed guest-host liquid crystal.

In the above-described polymer dispersed liquid crystal, the liquid crystal material may be dispersed within a set substance, or the set substance may be present in the form of a three-dimensional network within the liquid crystal material.

With a liquid crystal optical element in which a transparent solid substance is present in particulate form or network form, glass bead or various other high-molecular beads are used within the liquid crystal material. Examples of high-molecular substances include polyethylene, polymethyl methacrylate, polystyrene, polyamide, vinyl polychloride and their copolymers, and preferably, substances which cannot be dissolved in the liquid crystal material and for which reflectance corresponds to or is close to either the normal reflectance no or abnormal reflectance no of the liquid crystal material or the reflectance nc when the liquid material is randomly oriented.

For a liquid crystal optical element characterized in that the liquid crystal material is dispersed within the transparent solid substance, various high-molecular substances are available for use as the transparent solid substance including polyvinyl alcohol, polyvinyl formalin, polymethyl methacrylate, polystyrene or the like, and preferably, substances which are distinct from the liquid crystal material in phase and in which reflectance corresponds to or is close to either one of the normal light reflectance $n_0$ or abnormal reflectance $n_e$ of the liquid crystal material or the reflectance $n_{LC}$ when the liquid crystal material is randomly oriented.

The first and second dimmer layers may also be individually sandwiched by the substrates. That is, as shown in FIG. 6A, liquid crystal cells 21 and 23 are each composed of a dimmer layer sandwiched between transparent electrodes 17 and 19, these three layers in turn being sandwitched between transparent substrates 16 and 20. These color liquid crystal cells 21 and 23 sandwitch color filter 22 therebetween, as shown in FIG. 6B. However, as shown in FIGS. 7A, 7B, at least one of first and second dimmer layers 27 and 29 may be selected to be a liquid crystal of self-supporting solid form, such as a polymer dispersed liquid crystal, the number of substrates can be decreased to increase light transmission.

The electrode may be an electrically conductive substance extremely low in light absorption factor in the visible light area, such as ITO or the like. In addition, the electrode may be uniformly formed on the substrate in a specific pixel form or in the form of a strip of paper on the upper and lower substrates. An active element such as a transistor or diode may also be added to each pixel.

The particular color of the color filter may be individually displayed or, may be partially divided into three primary colors, for display in a mixed color. The color filter may also be present somewhere between the first and second dimmer layers on the light-reflecting layer, but to simplify production, is preferably located between the first and second dimmer layers or between the light-reflecting layer and the second dimmer layer.

The substrate used should allow the passage of light in the visible light area, such as a glass substrate or polyethylene telephthalate (PET) film.

The light-reflecting layer may be formed of any substance which reflects incident light. Specifically, metal or reflecting film composed of a dielectric substance or the like may be used. Preferably, a substance high in reflectance and free of wavelength dependence such as silver, aluminum, chromium, tin, nickel, tantalum or the like should be used.

The light-reflecting layer may be provided either between the second dimmer layer and the second electrode, between the second electrode and the second substrate, or behind the second substrate. Alternatively, the light-reflecting layer may be used as the substrate, or the light-reflecting layer and the electrode may be integrated by making the light-reflecting layer of an electrically conductive material such as metal. If the light-reflecting layer is located to precede the second substrate on the optical path, the second substrate need not be transparent and may take the form of an opaque substrate such as metal, semiconductor, plastic, or the like. Similarly, if the light-reflecting layer is located to precede the second electrode on the optical path, the second electrode need not be transparent.

This color display element is operated in the following manner. If black is to be displayed, the first dimmer layer is made transparent and the second dimmer layer is made light-absorptive. If color is to be displayed, the first and second dimmer layers are both made transparent. If white is to be displayed, the first dimmer layer is made to scatter light and the second dimmer layer may be either light-absorptive or transparent.

If each dimmer layer is independently sandwiched by the electrode-attached substrate, the above-described driving method may be readily realized by independently controlling each dimmer layer.

If polymer dispersed liquid crystal is used for each dimmer layer and the two dimmer layers are controlled by sandwiching between a pair of electrodes, the display can be realized by using an element having the characteristics shown in FIGS. 8A through 8D. In FIGS. 8A through 8D, solid line 14B indicates a light-transmitting characteristics of the first dimmer layer and dotted line 15B indicates a light-transmitting characteristics of the second dimmer layer.

Referring to FIG. 8A, the first dimmer layer provides a light-transmiting state when no voltage is applied and switches to a light-scattering state when voltage above a predetermined threshold level is applied. The second dimmer layer provides a light-absorbing state when no voltage is applied and switches to a light-transmitting state when voltage above a predetermined threshold level lower than that of the first dimmer layer is applied. As a result, if the applied voltage is gradually increased from zero, the display changes from black to color, and then to white.

Referring to FIG. 8B, the first dimmer layer provides a light-scattering state when no voltage is applied and switches to a transparent state when voltage above a predetermined threshold level is applied. The second dimmer layer provides a transparent state when no voltage is applied and switches to a light-absorbing state when voltage above a predetermined threshold level greater than that of the first dimmer layer is applied. As a result, if the applied voltage is gradually increased from zero, the display changes from white to color and then to black.

Referring to FIG. 8C, the first dimmer layer provides a light-scattering state when no voltage is applied and switches to a transparent state when voltage above a predetermined threshold level is applied. The second dimmer layer provides a light-absorbing state when no voltage is applied and switches to a light-transmitting state when voltage above a predetermined threshold level greater than that of the first dimmer layer is applied. As a result, if the applied voltage is gradually increased from zero, the display switches from white to black and then to color.

Referring to FIG. 8D, the first dimmer layer provides a transparent state when no voltage is applied and switches to a light-scattering state when voltage above a threshold value is applied. The second dimmer layer provides a transparent state when no voltage is applied and switches to a light-absorbing when voltage above a predetermined threshold level lower than that of the first dimmer layer is applied. As a result, if the applied voltage is gradually increased from zero, the display changes from color to black and then to white.

FIGS. 8B and 8D each illustrate cases in which the characteristics of the first and second dimmer layers differ from those of FIGS. 8A and 8C.

In order to obtain a color display element exhibiting the characteristic of FIG. 8A, employs a liquid crystal with a dielectric constant of either negative or both positive and negative anisotropy as the first dimmer layer, and a mixture of a liquid crystal with a dielectric constant of positive anisotropy and a dichroistic black pigment as the second dimmer layer. The liquid crystal of the first dimmer layer, is oriented so that it becomes transparent when no voltage is applied. Light may be illuminated onto a mixed solution of a liquid crystal material with a dielectric constant of negative or both positive and negative anisotropy, and a photo-setting compound with either an electric field or magnetic field or both applied to form the second dimmer layer.

In order to obtain a color display element exhibiting the characteristics of FIG. 8C, a liquid crystal with a dielectric constant of positive anisotropy may be used to change the physical property constant by, for example, making the dielectric constant anisotropy $\Delta\epsilon_1$ of the liquid crystal component of the first dimmer layer greater than that $\Delta\epsilon_2$ of the liquid crystal component of the second dimmer layer to lower the threshold voltage value.

If a high-molecular dispersive liquid crystal is to be used for the dimmer layer, the following methods may be used. A mixed solution of the photo-setting compound and the liquid crystal material is applied to the substrate on which the electrode is formed in accordance with a thin-film forming method such as the screen printing, offset printing, letterpress printing, intaglio printing, or spin coating method, and light is illuminated thereon to set-and form the dimmer layer. In order to form a color filter layer directly upon this layer, such methods as the above-described printing methods, a dyeing method, a pigment printing method, a photolithographic method or the like may be used.

In the second color display element of the present invention, white, black or color display becomes possible depending on whether the second dimmer layer scatters light, is transparent, absorbs light, or transmits light. The operation of the second color display element according to the present invention will next be described with reference to the specific case shown in FIG. 9 in which the color filter is disposed between the first and second dimmer layers.

A constructional feature of the second color display element of the present invention lies in that, as shown in FIG. 9, the first dimmer layer 9 may undergo a change from a light-scattering state to a transparent state, the second dimmer layer 11 may in turn undergo a change from a light-absorbing state to a light-transmitting state, and the color filter 10 disposed between the two dimmer layers 9, 11 and the light-reflecting layer 12B is provided at the side opposite to the direction 13 in which natural light enters. With this arrangement, there are roughly four possible states depending on whether the first and second dimmer layers 9 and 11 lie above and below color filter 10 and whether each scatters light, transmits light, or absorbs light.

(1B) The first dimmer layer 9 is transparent, and the second dimmer layer 11 transmits light.
(2B) The first dimmer layer 9 is transparent, and the second dimmer layer 11 absorbs light.
(3B) The first dimmer layer 9 scatters light, and the second dimmer layer transmits light.
(4B) The first dimmer layer 9 scatters light, and the second dimmer layer 11 absorbs light. Each of the above-described states is hereinafter described.

In case (1B), since the first dimmer layer 9 is transparent and the second dimmer layer 11 transmits light, the incident light passes through the first dimmer layer 9, color filter 10 and second dimmer layer 11 to reach light-reflecting layer 12B, where it is reflected, and passes through the second dimmer layer 11, color filter 10 and first dimmer layer 9 again to be emitted to outside the liquid crystal element. As a result, this combination enables color to be displayed.

In case (2B), since the first dimmer layer 9 is transparent, light passes through the first dimmer layer 9 to enter color filter 10. Since the light which passes through color filer 10 is absorbed by the second dimmer layer 11, it cannot be emitted to the outside. As a result, this combination enables black to be displayed.

In case (3B), since the first dimmer layer 9 scatters light, most of the incident light is scattered and emitted to the outside. On the other hand, since the second dimmer layer 11 is transparent, the portion of light which passes through the first dimmer layer 9 then passes through the color filter 10 and the second dimmer layer 11 and is reflected by the light-reflecting layer 12. The reflected light passes back through the second dimmer layer 11 and color filter 10 and again enters the first dimmer layer 9. At this point, the light scattered forward of the first dimmer layer 9 is emitted to the outside, and the light scattered to the rear reaches the light-reflecting layer 12B again to repeat this cycle. Therefore, the light emitted to the outside constitutes the sum of the component of the light scattered to the rear by the first dimmer layer 9 and the light reflected by light-reflecting layer 12B. If the color pitch of color filter 10 is small, this combination enables the white to be displayed because the color difference cannot be discriminated by human eyes and the light which passes through light reflecting layer 12B can also be assumed to be white.

In case (4B), since the first dimmer layer 9 scatters light, most of the incident light is scattered and emitted to the outside. On the other hand, since the second dimmer layer 11 absorbs light, a portion of the light passes through the first dimmer layer 9, passes through color filter 10 to be absorbed by the second dimmer layer 11. At this time, the light which can be seen when observed from outside is only that which is scattered by the first dimmer layer 9. As a result, this combination also enables the display of white.

If the driving electrode corresponds to each of the first and second dimmer layers 9 and 11, the above-described combination may be realized depending on the driving mode of each liquid crystal.

If the first and second dimmer layers 9 and 11 are sandwiched together by a pair of electrodes without any independent electrode, each of the dimmer layers 9 and 11 may be controlled as shown in FIGS. 8A through 8D. Incidentally, in describing the operation of the element, it is assumed that a polymer dispersed liquid crystal is used as the first dimmer layer 9 and a polymer dispersed liquid crystal which disperses a guest-host liquid crystal therein is used for the second dimmer layer 11.

FIG. 8A illustrates the relationship between the applied voltage and the light transmission degree in the case of (2B)–(1B)–(3B). Here, for the first dimmer layer 9, a liquid crystal with a dielectric constant of either negative or both positive and negative anisotropy is used to drive in the reverse mode. For the second dimmer layer 11, a crystal with a dielectric constant of positive anisotropy is used to drive in the normal mode. As shown, if the threshold voltage level of the first dimmer layer 9 is made greater than that of the second dimmer layer 11, the first dimmer layer 9 will transmit light and the second dimmer layer 11 will absorb light when no voltage is applied, enabling black to be displayed. If the voltage applied exceeds the threshold voltage level of the second dimmer layer 11, the second dimmer layer 11 will switch to a light-transmitting state, enabling a color to be displayed. If the applied voltage is further increased to exceed the threshold voltage level of the first dimmer layer 9, the first dimmer layer 9 will switch to a light-scattering state, enabling white to be displayed.

FIG. 8B illustrates the relationship between the applied voltage and the light transmission degree in the case of (3B)–(1B)–(2B). For the first dimmer layer 9, a liquid crystal with a dielectric constant of positive anisotropy is used to drive in the normal mode. For the second dimmer layer 11, a liquid crystal with dielectric constant of either negative or both positive and negative anisotropy is used to drive in the reverse mode. As shown, if the threshold voltage level of the first dimmer layer 9 is made lower than that of second dimmer layer 11, first dimmer layer 9 will scatter light and the second dimmer layer 11 will transmit light when no voltage is applied, enabling white to be displayed. If the voltage is increased to exceed the threshold voltage level of the first dimmer layer 9, the first dimmer layer 9 will become transparent, enabling color to be displayed. If the voltage is further increased to exceed the threshold voltage value of the second dimmer layer 11, the second dimmer layer 11 will switch to a light-absorbing state, enabling black to be displayed.

FIG. 8C illustrates the relationship between the applied voltage and the light transmission degree in the case of (4B)–(2B)–(1B). Here, the first and second dimmer layers 9 and 11 are both driven in the normal mode. As shown, if the threshold voltage level of the first dimmer layer 9 is made smaller than that of the second dimmer layer 11, the first dimmer layer 9 will scatter light and the second dimmer layer 11 will absorb light when no voltage is applied, resulting in a white display. If the voltage is increased to exceed the threshold voltage value of the first dimmer layer 9, the first dimmer layer 9 will become transparent, resulting in a black display. If the applied voltage is further increased to exceed the threshold voltage level of the second dimmer layer 11, the second dimmer layer 11 will also switch to a light-transmitting state, resulting in the display of a color.

FIG. 8D illustrates the relationship between the applied voltage and light transmission degree in the case of (1B)–(2B)–(4B). In this case, both the first and second dimmer layers 9 and 11 are driven in the reverse mode. As shown, if the threshold voltage level of the first dimmer layer 9 is greater than that of the second dimmer layer 11, the first dimmer layer 9 will be transparent and the second dimmer layer 11 will transmit light when no voltage is applied, resulting in a color display. If the applied voltage is increased to exceed the threshold voltage value of the second dimmer layer, the second dimmer layer 11 will switch to a light-absorbing state, resulting a black display. If the applied voltage is further increased to exceed the threshold voltage level of the first dimmer layer 9, the first dimmer layer 9 will switch to a light-scattering state, resulting in a white display.

The reverse mode element is made in the following manner. Light is illuminated to set a mixed solution of liquid crystal material with a dielectric constant of either a negative or both positive and negative anisotropy and of a photo-setting compound with either an electric field or magnetic field, or both, applied so that it may turn transparent to form a dimmer layer. If the photo-setting compound is set with the liquid crystal oriented so as to become transparent when the electric field or the magnetic field is applied, after the photo-setting compound is set, the liquid crystal molecules will not be able to return to a random state and will be fixed by anchoring the interface surface even if the electric field or the magnetic field is removed. Although this state cannot be changed with the liquid crystal with a dielectric constant of positive anisotropy, it can be changed into a light-scattering state with a crystal with a dielectric constant of positive anisotropy.

Let us assume that a liquid crystal is used in which the crossover frequency fc is, for example, 10 kHz and that, at lower frequencies, the dielectric constant anisotropy $\Delta\epsilon$ becomes greater than zero and, at higher frequencies, it becomes smaller than zero. If the photo-setting compound is set by applying a voltage of low frequency below 10 kHz between the substrates, the orientation of the liquid crystal molecules will be fixed in the direction perpendicular to the substrate. Assuming that its light-transmitting state at this time is transparent, if a voltage of frequency greater than 10 kHz is applied during operation, the liquid crystal molecules can be switched to a light-scattering state.

In addition, for a normal liquid crystal having an aromatic ring such as a benzene ring, although the dielectric constant anisotropy $\Delta\epsilon$ can take either positive or negative values depending on the molecular configuration, the value of the magnetizing anisotropy $\Delta\chi$ can take only the positive value. Therefore, if, by using a liquid crystal negative in the dielectric constant anisotropy, the photo-setting compound is set with a magnetic field which is sufficiently stronger than the Fredericks transition point of the liquid crystal applied perpendicular to the substrate, the orientation of the liquid crystal will be fixed in the direction perpendicular to the substrate. Assuming that the light-transmitting state of the crystal at this time is transparent, voltage applied during operation will cause the liquid crystal molecule to change to an orientation parallel to the substrate and change to a light-scattering state.

Although it was previously assumed that color filter 10 should be arranged between the first and second dimmer layers 9 and 11, in view of the principles of the present invention, it can be seen that color filter 10 may be present at various points along the path between the point where light passes through the first dimmer layer 9, is reflected by the light-reflecting layer 12B, and the point where it reenters the first dimmer layer 9. The color filter 10 may be positioned not only between the first dimmer layer 9 and the second dimmer layer 11, but also between the second dimmer layer 11 and the light-reflecting layer 12B, or in the space obtained by dividing the second dimmer layer 11 into two parts. As necessary, the color filter 10 may also serve as the second dimmer layer 11 by coloring the second dimmer layer per se.

Other features and advantages of the invention will be apparent from the following description taken in conjunction with the accompanying drawings.

DETAILED DESCRIPTION OF THE PREFERRED EMBODIMENTS

The present invention is hereinafter described with reference to several embodiments but it is to be understood that the invention may take forms not described in these embodiments as long as such forms do not exceed the technical essence of the invention.

Embodiment 1

A specific embodiment of the color display element according to the present invention is described with reference to FIGS. 2A and 2B.

Figure 1A:
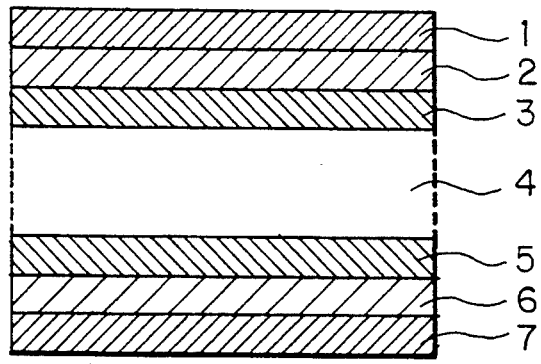
FIGS. 1A through 1C are cross-sectional views of a liquid crystal display according to the prior art.
Figure 1B:
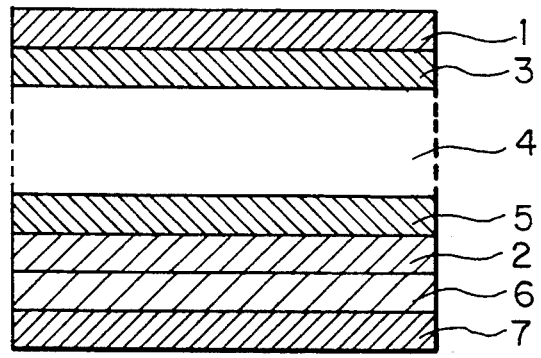
Figure 1C:
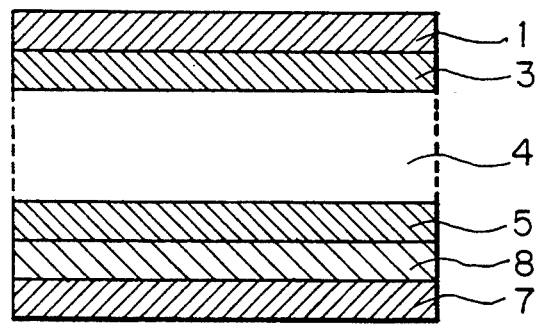
Figure 2A:
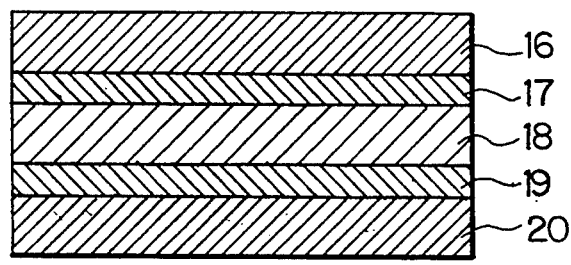
FIGS. 2A and 2B are cross-sectional views of a color display element according to a specific embodiment of the present invention.

As shown in FIG. 2A, the color display element according to this embodiment employs a pair of transparent substrates 16 and 20 on the surface of which transparent electrodes 17, 19 composed of an ITO are formed. On this transparent electrode 19, a mixed solution of ultraviolet setting compound and a liquid crystal is applied as a dimmer layer 18 by a screen printing method. Spacers 20 μm in diameter are scattered on the transparent substrate 16 and the substrate 16 is overlapped so that air bubbles may not enter, and pressure is applied to form a cell gap of about 20 μm. If ultraviolet rays are then irradiated upon this liquid crystal cell to set the compound, a polymer dispersed liquid crystal (PDLC) will be obtained. In this case, a mixed solution comprising 10% 2-ethylhexyl acrylate of a polymerizing monomer, 20% polymerizing oligomer UN-9000PEP, 60% nematic liquid crystal E8 and 0.2% benzophenone, a polymerization initiating agent, was used as the ultraviolet setting compound.

Figure 2B:
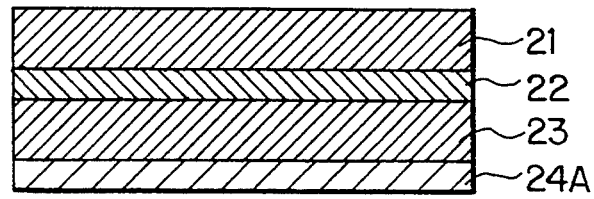

Two sets of liquid crystal cells 21, 23 prepared as above are disposed so that a color filter 22 lies between them, as shown in FIG. 2B. A light-absorbing layer 24A is then attached to the surface of liquid crystal cell 23 opposite the surface upon which color filter 22 is arranged to complete the color display element. In this embodiment, since the dimming factor of each liquid crystal cell 21 and 23 is independently controlled via separate power supplies, the above-described four combinations (1A)–(4A) may all be realized. That is, if voltage is applied to both liquid crystal cells 21 and 23, the state (1A) will be achieved, causing black to be displayed, if voltage is applied to only liquid crystal cell 21, then the state 2A will be achieved, causing color to be displayed and if voltage is applied to only liquid crystal cell 23, state (3A) will be achieved, causing white to be displayed. If no voltage is applied to either of the liquid crystal cells 21 and 23, state (4A) will be achieved, causing white to be displayed.

Figure 10A:
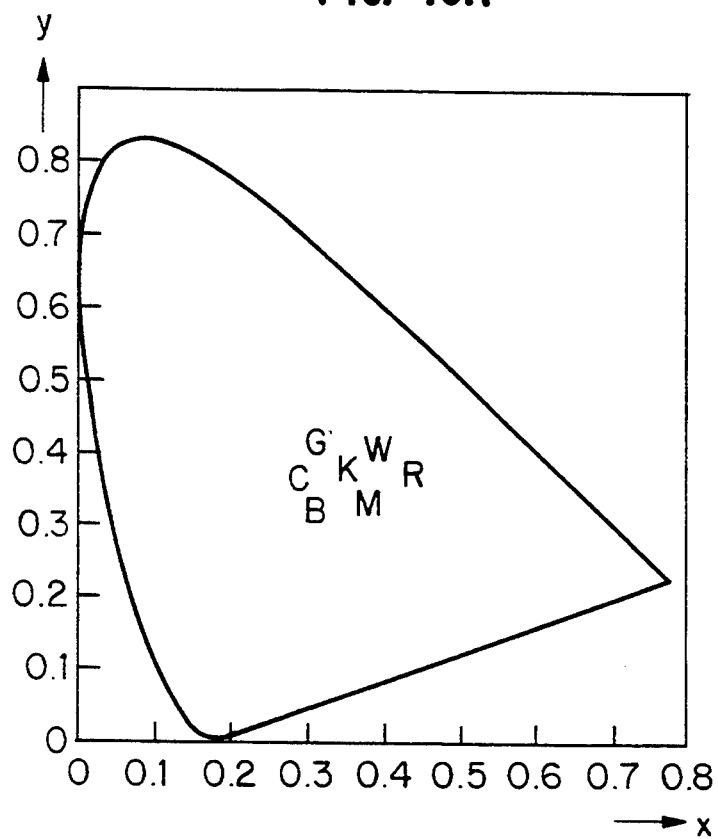
FIGS. 10A and 10B are views illustrating effects unique to the present invention.
Figure 10B:
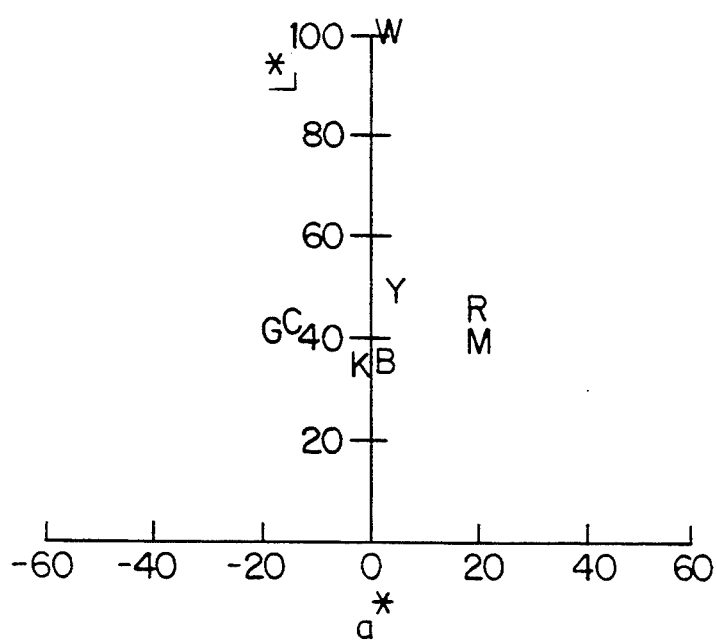

Color filter 22 is arranged by disposing red, green and blue color filters in the form of strips of paper. The transparent electrode of liquid crystal cells 21, 23 corresponding to this color filter 22 are arranged as in color filter 22. FIGS. 10A and 10B each illustrate the results obtained by measuring the tone and brightness of a color display obtained by applying voltage to this color display element in accordance with a color brightness system BM-5A available from TOPCON Inc. FIG. 10A illustrates a CIE xy color area when the color disposition of color filter 22 is arranged in the order of red, green and blue and the color of the non-selected portion is black. FIG. 10B illustrates a plot on L*a* coordinate system in a CIE L*a*b* colorimetric system. From FIG. 10A, it can be seen that the color display element according to the embodiment can display color and, from FIG. 10B, it can be seen that a monochrome display of excellent contrast is possible.

Incidentally, in this embodiment, although the color filter combined red, green and blue, sufficient color reproducibility was also obtained when a color filter combining cyan, magenta and yellow was used. Further, in this embodiment, although black was selected as the background color (the color prevailing at the non-selected portion), it is of course possible to select white.

Embodiment 2

Although the color display element in the embodiment 1 was achieved by combining independently prepared liquid crystal cells 21 and 23, if the arrangement of the embodiment 1 is chosen, it is not always necessary to use transparent electrodes 17 and 19 and transparent substrates 16 and 20, which lie above and below the color filter 22. Therefore, a second embodiment of the present invention which has dimmer layers immediately above and below color filter 22 will be now described with reference to FIG. 3.

Figure 3:
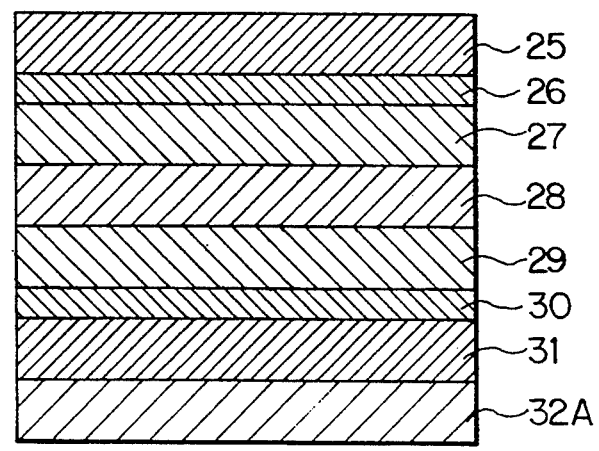
FIG. 3 is a cross-sectional view of a color display element according to another embodiment of the present invention.

As shown in FIG. 3, the color display element of this embodiment employs a pair of transparent substrates 25 and 31 on the surface of which are formed transparent electrodes 26 and 30 composed of an ITO. On this transparent electrode 30, a mixed solution of ultraviolet setting compound and a liquid crystal is applied in a layer of about 20 μm in thickness as a second dimmer layer 29 by a screen printing method. Subsequently, the assembly is illuminated with ultraviolet rays to set the mixed solution and thereby forming a polymer dispersed liquid crystal. A color filter 28 is then directly formed on the second dimmer layer 29 by a printing method and, in addition, a mixed solution of the ultraviolet setting compound and the liquid crystal about 20 μm in thickness is applied to the color filter 28 by a screen printing method. After a transparent substrate 25 attached to a transparent electrode 26 is further laid on the mixed solution so as to prevent air bubbles from entering, the assembly is illuminated with ultraviolet rays from the side of the transparent substrate 25 to set the mixed solution and complete the dimmer layer 27. Finally, if a light-absorbing layer 32A is formed on the surface of transparent substrate 31 opposite the surface upon which the transparent electrode 30 is arranged, a color display element may be obtained. In the nematic liquid crystal used in this embodiment, a liquid crystal positive in dielectric constant anisotropy is used for both the first and second dimmer layers 28 and 29. In addition, although the second dimmer layer 29 in this embodiment was described as having been formed first for the sake of convenience, as can be seen from FIG. 3, there will be no problem in first forming the first dimmer layer 27, because it has a plane-symmetrical construction with the color filter 28 taken as its center except for the light-absorbing layer 32A.

Figure 4A:
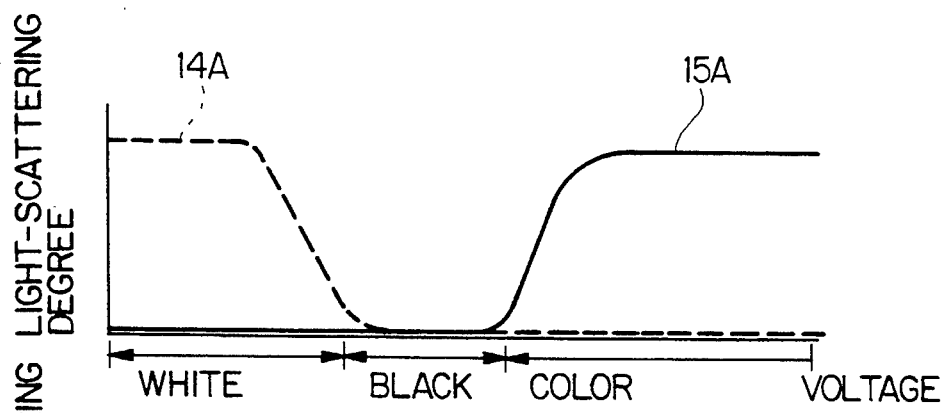
FIGS. 4A through 4D are views illustrating the light-scattering characteristic of the first and second dimmer layers.
Figure 4B:
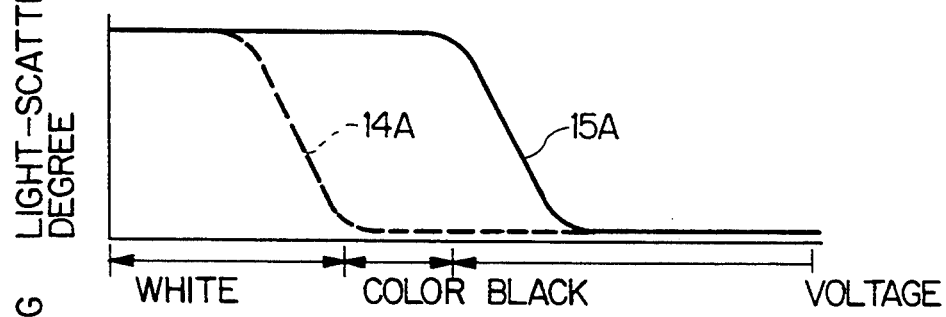
Figure 4C:
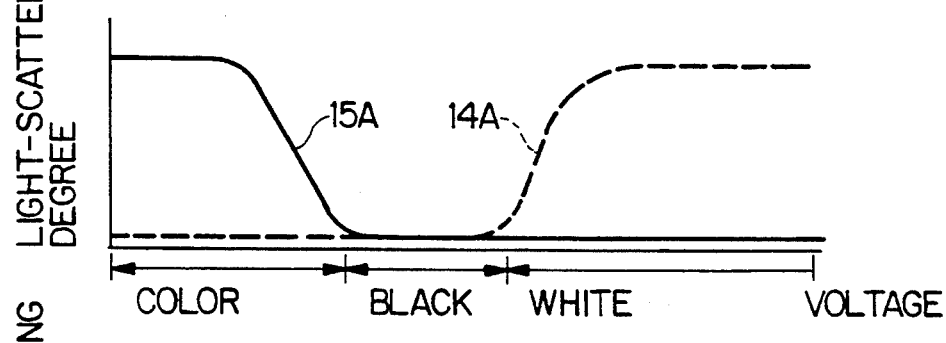
Figure 4D:
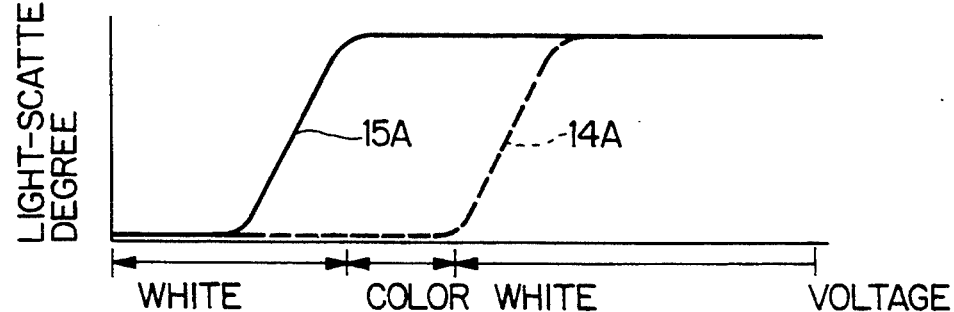
Figure 5:
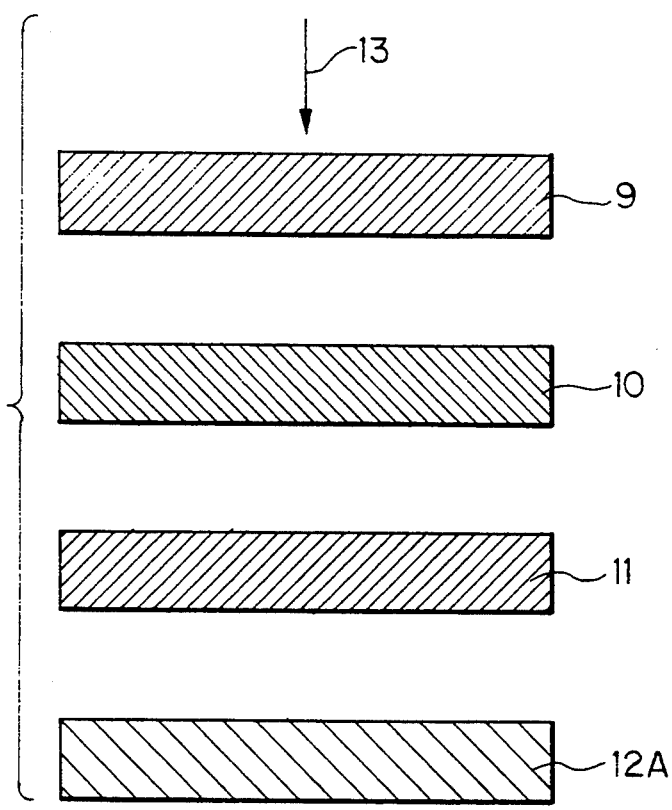
FIG. 5 is a view illustrating the basic arrangement of a first reflecting color display element according to the present invention.
Figure 9:
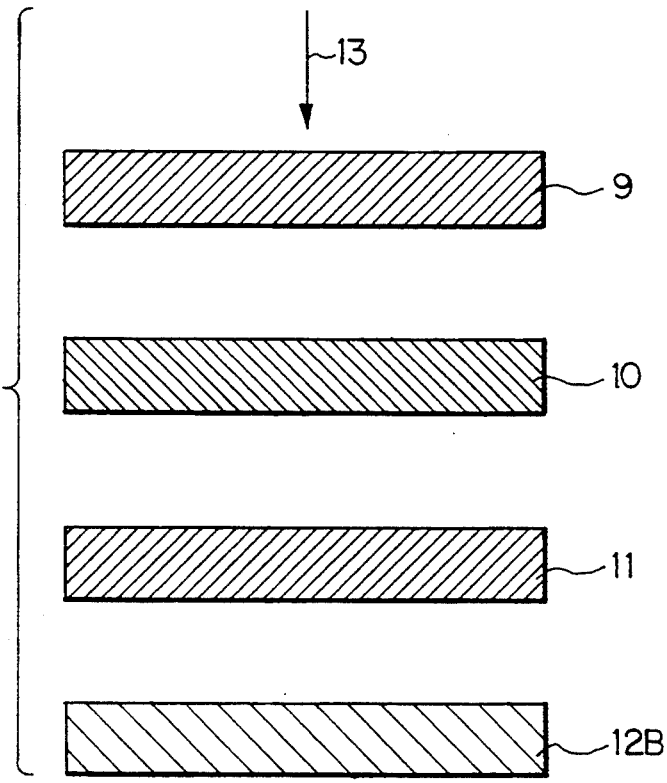
FIG. 9 is a view illustrating the basic arrangement of a second reflecting type color display element according to the present invention.

In the color display element of this embodiment, since the electric field applied to the liquid crystal cell is applied between the transparent electrodes 26 and 30, a uniform electric field will be applied to the first and second dimmer layers 27 and 29. Therefore, in order to achieve color display, the composition of the first and second dimmer layers 27 and 29 is changed to lower the threshold voltage, and the threshold voltages of the first and second dimmer layers 27 and 29 are made to differ in order to obtain the light-scattering characteristics shown in FIG. 4B. To this end, the relative amounts of the monomer (2-ethylhexyl acrylate), oligomer (UN-9000PEP), and liquid crystal (E8) of a high-molecular precursor was changed to alter the threshold voltage when the element was set. Specifically for the first dimmer layer 27, the monomer and the oligomer were mixed at a ratio of 1:2, and the resulting ultraviolet setting resin 35 (wt. %) and liquid crystal 65 (wt. %) were mixed and set at 15 degrees C. For the second dimmer layer 29, the monomer and the oligomer were mixed at a ratio of 1:1 and the resulting ultraviolet setting resin 30 (wt. %) and liquid crystal 70 (wt. %) were mixed and set at 10 degrees C. to achieve the light-scattering characteristics shown in FIG. 4B.

If gradually increasing voltage is applied to the resulting reflecting color display element until 6 V is exceeded, which displays white when no voltage is applied, the first dimmer layer 27 will change from a light-scattering state to a transparent state, thereby allowing color to be displayed, and will fully display color at 10 v. If the voltage is further increased, the second dimmer layer 29 will change from a light-scattering state to a transparent state at 12 V, and its reflecting brightness will begin to decrease, finally displaying black at around 24 V when the first and second dimmer layers 27 and 29 both become transparent.

When the color display achieved by the color display element of this embodiment was measured, it was found that display qualities similar to those of embodiment 1 could be obtained.

Embodiment 3

In the embodiment 2, a nematic liquid crystal used for both the first and second dimmer layers 27 and 29 was positive in dielectric constant anisotropy. In this embodiment, a double frequency driven liquid crystal is used for the liquid crystal component of the second dimmer layer 29 so that the second dimmer layer 29 will be transparent when no voltage is applied and will enter a light-scattering state when voltage is applied.

In order to achieve such an optical change, a double frequency driven liquid crystal (commercially available from Chisso Inc. $n_0=1.509$, $\Delta_n=0.154$) was used for the liquid crystal constituting the second dimmer layer 29, and a liquid crystal obtained by mixing the monomer (2-ethylhexyl acrylate) and the oligomer (UN-9000PEP) at a ratio of 1:1 was used as the high-molecular precursor. The second dimmer layer 29 was illuminated by ultraviolet rays while a low-frequency (100 Hz) voltage of 50 V being applied in order to set the mixed solution with the liquid crystal lying perpendicular to the substrate in its initial state. The first dimmer layer 27 was obtained by first preparing an ultraviolet setting resin by mixing the monomer and the oligomer at a ratio of 1:2, mixing the resulting ultraviolet setting resin with the liquid crystal (E8) in ratios of 35 (wt. %) and 65 (wt. %) respectively, and illuminating the mixture with ultraviolet rays for setting. As described above, the light-scattering characteristics shown in FIG. 4A can be obtained by arranging the first and second dimmer layers 27 and 29. In the liquid crystal used for the second dimmer layer 29 in this embodiment, since the crossover frequency (the frequency at which the dielectric constant taken in the direction of the major axis of the liquid crystal molecules equals the dielectric constant taken in the direction of the minor axis of the liquid crystal modules) is 10 kHz, at frequencies above this value, $\Delta\epsilon<0$. Therefore, the color display element will display white when no voltage is applied, and when driven by a high-frequency voltage of 100 kHz, the second dimmer layer 27 will begin to change from a light-scattering state to a transparent state when the voltage exceeds 6 V and will become transparent at 10 V. At this time, since the second dimmer layer 29 is still transparent, black will be displayed. If the voltage is further increased, the second dimmer layer 29 will begin to change from a transparent state to a light-scattering state and will become completely light-scattering at 45 V, causing color to be displayed. As described above, in the color display element of this embodiment, it was possible to achieve monochrome and color displays of excellent contrast within the same pixel.

In this embodiment, the device used for the second dimmer display 29 may be a DSM or any similar device which changes from a transparent state to a light-scattering state and is not necessarily restricted to the polymer dispersed liquid crystal using the double frequency driven liquid crystal.

Embodiment 4

In embodiment 3, a double frequency driven liquid crystal was used for the liquid crystal component constituting the polymer dispersed liquid crystal layer, resulting in a second dimmer layer 29 which is transparent when no voltage is applied and which is light-scattering when voltage is applied. In this embodiment, the above-described conditions were created by using a liquid crystal having an aromatic ring within its basic skeleton and negative in $\Delta\epsilon$ and imparting an initial orientation to the magnetic field.

In order to achieve such an optical change in this embodiment, a liquid crystal negative in $\Delta\epsilon$ ($n_0=1.509$, $\Delta n=0.154$, $\Delta\epsilon=-3.1$) was used as the liquid crystal component constituting the second dimmer layer 29 and a liquid crystal using the monomer (2-ethylhexyl acrylate) and the oligomer (UN=9000PEP) at a ratio of 1:1 was used as the high molecular precursor. When a solution made up of 35 (wt. %) of this high-molecular precursor and 65 (wt. %) of the liquid crystal was illuminated by ultraviolet rays to set and form the second dimmer layer 29, a magnetic field of 10 kG was applied. This field is sufficiently greater than the Fredericks transition point of the liquid crystal and causes the liquid crystal molecules to become perpendicular to the substrate in the initial condition. The first dimmer layer 27 was obtained by mixing the monomer and the oligomer at a ratio of 1:2, mixing the resulting ultraviolet setting resin with the liquid crystal (E8) in amounts of 35 (wt. %) and 65 (wt. %), respectively, and illuminating the mixture with ultraviolet rays. By forming the first and second dimmer layers 27 and 29 as described above, the light-scattering characteristics shown in FIG. 4A can be obtained. In this embodiment, the color display element displays white when no voltage was applied. When the applied voltage exceeds 6 V, the first dimmer layer 27 will begin to change from a light-scattering state to a transparent state, and at 10 V, it becomes transparent. At this time, since the second dimmer layer 29 is still transparent, black will be displayed. If the applied voltage is further increased, the second dimmer layer 29 will begin to change from a transparent state to a light-scattering state at 30 V and will become completely light-scattering at 52 V, causing color to be displayed. As described above, this embodiment enables both monochrome and color displays of excellent contrast within the same pixel.

Embodiment 5

A color display element according to embodiment 5 will now be described with reference to FIGS. 6A through 6C.

Figure 6A:
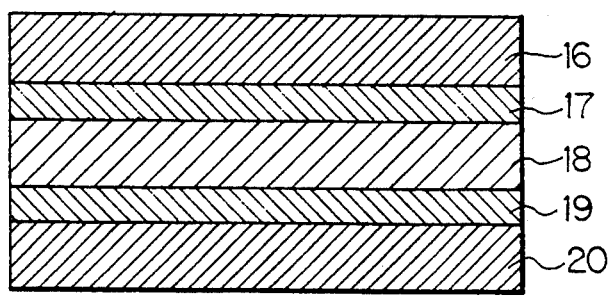
FIGS. 6A through 6C are cross-sectional views of a color display element according to a specific embodiment of the present invention.
Figure 6B:
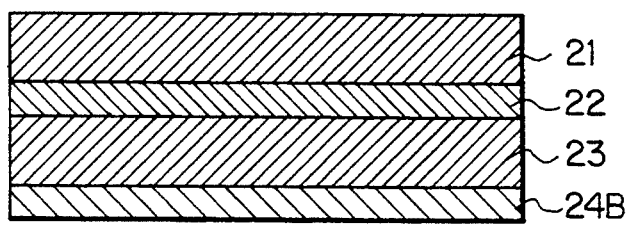
Figure 6C:
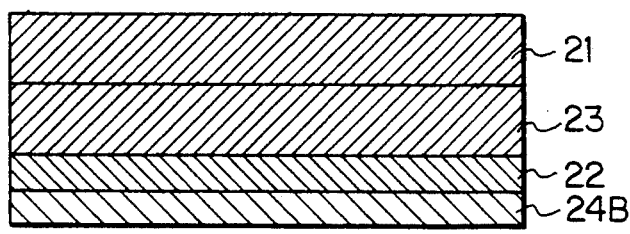

As shown in FIG. 6A, the color display element of this embodiment employs a pair of transparent substrates 16 and 20, on the surface of which transparent electrodes 17 and 19 composed of an ITO are formed. A mixed solution of ultraviolet setting compound and liquid crystal is applied as the dimmer layer 18 onto this transparent electrode 19 by a screen printing method. A transparent substrate 16 upon which spacers 20 μm in diameter are scattered is overlaid on the transparent electrode 17 to prevent air bubbles from entering, and pressure is applied to form a cell gap of about 20 μm. This liquid crystal cell is then illuminated with ultraviolet rays to set the ultraviolet setting compound and form a polymer dispersed liquid crystal (PDLC). In this case, a mixed solution made up of 10% of 2-ethylhexyl acrylate (the polymerizing monomer), 20% of polymerizing oligomer UN-9000PEP, 60% of nematic liquid crystal (E8), and 0.2% of polymerizing initiating agent (benzophenone) was used as the ultraviolet setting compound.

A guest-host liquid crystal containing 0.4% by weight of azoic pigment (a black dichroism pigment) mixed with the nematic liquid crystal (E8) was used as the liquid crystal component constituting the resulting liquid crystal cells 21 and 23 and the dimmer layer 18. As shown in FIG. 6B, a color filter 22 is disposed between the liquid crystal cells 21 and 23, and a light-reflecting layer 24B was applied to the surface of the liquid crystal cell 23 opposite the color filter 22 to form a color display element. In this embodiment, since the dimmer layers of the liquid crystal cells 21, 23 are each independently controlled via a separate power supplies, the above-described states 1B-4B may all be realized. That is, if voltage is applied to both liquid crystal cells 21 and 23, the state (1B) will be achieved, causing color to be displayed, if voltage is applied to only the liquid crystal cell 21, the state (2B) will be achieved, causing black to be displayed, if voltage is applied to only liquid crystal cell 23, the state (3B) will be achieved, causing white to be displayed, and if no voltage is applied either of the liquid cells 21 and 23, state (4B) will be achieved, causing white to be displayed.

Color filter 22 is arranged by disposing red, green and blue color filters in the form of strips of paper transparent electrodes of liquid crystal cells 21 and 23 corresponding to this color filter 22 are arranged as in the color filter 22. An arrangement was used in this embodiment which the color filter 22 is sandwiched between the liquid crystal cells 21 and 23, as shown in FIG. 6B, but as shown in FIG. 6C, even if the color filter 22 were disposed between the liquid crystal cell 23 and the light-reflecting layer 24B, as in the case of FIG. 6B, white, black and color could still be displayed.

Incidentally, in this embodiment although the color filter combined red, green and blue, sufficient color reproducibility was obtained even when a color filter combining cyan, magenta and yellow was used. Further, in this embodiment, although black was selected as the background color (the color prevailing at the non-selected portion) it is of source possible to select white.

Embodiment 6

Although the color display element in the embodiment 5 was achieved by combining independently prepared liquid crystal cells 21 and 23, if the arrangement of embodiment 5 is chosen, it is not always necessary to use transparent electrodes 17 and 19 and transparent substrates 16 and 20 which lie above and below the color filter 22. Therefore, embodiment 6 of the present invention which has dimmer layers immediately above and below the color filter 22 will now be described with reference to FIGS. 7A and 7B.

Figure 7A:
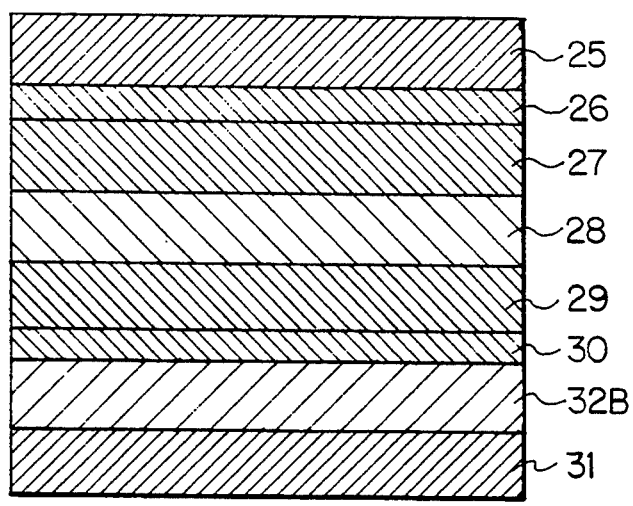
FIGS. 7A and 7B is a cross-sectional view of a color display element according to another embodiment of the present invention.

As shown in FIG. 7A, the color display element of this embodiment employs a transparent substrate 25 on the surface of which is formed a transparent electrode 26 composed of an ITO, a substrate 31 on the surface of which is formed a light-reflecting layer 32B, and a transparent electrode 30 composed of an ITO is formed on the surface of the light-reflecting layer 32B. On this transparent electrode 30, a mixed solution of the ultraviolet setting compound and a guest-host liquid crystal which includes a black dichroism pigment is applied in a layer of about 20 μm in thickness as a second dimmer layer 29 by a screen printing method. Subsequently, the assembly is illuminated with ultraviolet rays, to set the mixed solution and thereby forming a polymer dispersed liquid crystal. A color filter 28 is then directly formed on the second dimmer layer 29 by a printing method and, in addition a mixed solution of the ultraviolet setting compound and the liquid crystal is applied to color filter 28 by about 20 μm in thickness by a screen printing method. After a transparent substrate 25 attached to a transparent electrode 26 is further applied to the mixed solution layer to prevent air bubbles from entering, the assembly is illuminated with ultraviolet rays from the side of the transparent substrate 25 to set the mixed solution, thereby forming the first dimmer layer 27 and completing a color display element. In the nematic liquid crystal used in this embodiment, a liquid crystal positive in the dielectric constant anisotropy is used for both the first and second dimmer layers 27 and 29. In addition, although the second dimmer layer 29 in this embodiment was described as having been formed first for the sake of convenience, as can be seen from FIGS. 7A and 7B, there will be no problem in first forming the first dimmer layer 27, because it has a plane-symmetrical construction with color filter 28 taken as its center except for the light-reflecting layer 32B.

Figure 8A:
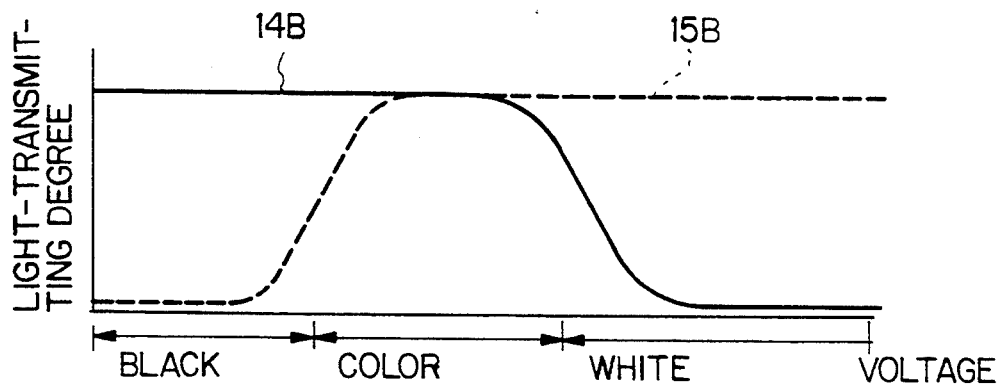
FIG. 8A through 8D are views illustrating the light-transmitting characteristics of the first and second dimmer layers.

In the color display element of this embodiment, since the electric field applied to the liquid crystal cell is applied between the transparent electrodes 26 and 30, a uniform electric field will be applied to the first and second dimmer layers 27 and 29. Therefore, in order to achieve color display, the compositions of the first and second dimmer layers 27 and 29 is changed to lower the threshold voltage of the first dimmer layer 27 than that of the second dimmer layer 29 and the threshold voltages of the first and second dimmer layers 27 and 29 are made differ in order to obtain the light-transmitting characteristics shown in FIG. 8C. To this end, the relative amounts of the monomer (2-ethylhexyl acrylate), oligomer (UN-9000PEP) and the liquid crystal (E8) of the high-molecular precursor was changed to alter the threshold voltage when the element was set. Specifically, for the first dimmer layer 27, the monomer and the oligomer were mixed at a ratio of 1:2 35 (wt. %) of the resulting ultraviolet setting resin and 65 (wt. %) the liquid crystal 65 (wt. %) were mixed and set at 15 degrees C. For the second dimmer layer 29, the monomer and the oligomer were mixed at a ratio of 1:1, and 30 (wt. %) of the resulting ultraviolet setting resin and 70 (wt. %) of the guest-host liquid crystal (a guest-host liquid crystal obtained by mixing 0.4 (wt. %) of an azoic pigment with the crystal) were mixed and set at 10 degrees C. to achieve the light-transmitting characteristics shown in FIG. 8C.

The resulting reflecting color display element displays white when no voltage is applied. If gradually increasing voltage is applied to the element and exceeds 6 V, the first dimmer layer 27 begins to change from a light-scattering state to a transparent state, thereby allowing color to be displayed, and will fully display color at 10 V. If voltage is further increased, the second dimmer layer 29 will begin to change from a light-scattering state to a transparent state at 12 V, and its reflecting brightness will begin to decrease, finally displaying black at around 24 V, when the first and second dimmer layers 27 and 29 both become transparent.

In this embodiment, as in the embodiment 5, it is possible to dispose color filter 28 between the second dimmer layer 29 and light-reflecting layer 32B. However, with this arrangement, the first and second dimmer layers 27 and 29 will come in direct contact with each other, and since the components of the liquid crystal constituting the first and second dimmer layers 27 and 29 are different from each other, care should be taken that these two components are not mixed with each other. Therefore, in this embodiment, in order to prevent the liquid crystal of the first and second dimmer layers 27 and 29 from mixing, a polyimide film was formed by the spin-coating method to form a film 33 which separates the layers. Although a polyimide spin-coated film was used as the interlayer separation film 33 in this embodiment, since this film 33 is provided only to prevent the mixture of the liquid crystal of the first and second dimmer layers 27 and 29, other substances transparent to visible light such as glass, polymer or the like may naturally be used.

Embodiment 7

In the embodiment 6, a nematic liquid crystal used for both the first and second dimmer layers 27 and 29 was positive in dielectric constant anisotropy. In this embodiment, a double frequency driven liquid crystal is used for the liquid crystal component of the first dimmer layer 27 so that the first dimmer layer 27 will be transparent when no voltage is applied and will enter a light-scattering state when voltage is applied.

In order to obtain such an optical change in this embodiment, a double frequency driven liquid crystal (commercially available from Chisso Inc. $n_0=1.509$, $\Delta n=0.154$) was used for the liquid crystal constituting the first dimmer layer 27, and a liquid crystal obtained by mixing the monomer (2-ethylhexyl acrylate) and the oligomer (UN=9000EP) at a ratio of 1:1 was used as the high-molecular precursor. The first dimmer layer 27 was illuminated by ultraviolet rays while a low-frequency (100 Hz) voltage of 50 V being applied in order to set the mixed solution with the liquid crystal molecules lying perpendicular to the substrate in their initial state. The second dimmer layer 29 was obtained by first preparing an ultraviolet setting resin by mixing monomer and the oligomer at a ratio of 1:2, mixing the resulting ultraviolet setting resin with the liquid crystal (a guest-host liquid crystal obtained by adding 0.4 wt. % of the azoic pigment to E8) in ratio of 35 [wt. %] and 65 [wt. %] respectively, and illuminating with ultraviolet rays for setting. As described above, the light-transmitting characteristics shown in FIG. 8A can be obtained by arranging the first and second dimmer layers 27 and 29. In the liquid crystal used for the first dimmer layer 27 in this embodiment, since the crossover frequency, or the frequency which assures that $\epsilon_\perp = \epsilon_\parallel$, is 10 kHz, at frequencies above this value, $\epsilon < 0$. Therefore, the color display element will display black when no voltage is applied, when driven by a high-frequency (100 kHz) voltage, the second dimmer layer 29 will begin to change from a light-absorbing state to a light-transmitting state when the voltage exceeds 6 V and will become transparent at 10 V. At this time, since the first dimmer layer 27 is still transparent, color will be displayed. If the voltage is further increased, the first dimmer layer 27 will begin to change from a transparent state to a light-scattering state at 25 V and will become completely light-scattering at 45 V, causing white to be displayed. As described above in the color display element of this embodiment, it was possible to achieve monochrome and color displays of excellent contrast within the same pixel.

In this embodiment, the device used for the first dimmer layer 27 may be a DSM or any similar devices which changes from a transparent state to a light-scattering state and is not necessarily be restricted to the polymer dispersed liquid crystal (PDLC) using the double-frequency driven liquid crystal.

Embodiment 8

Figure 8B:
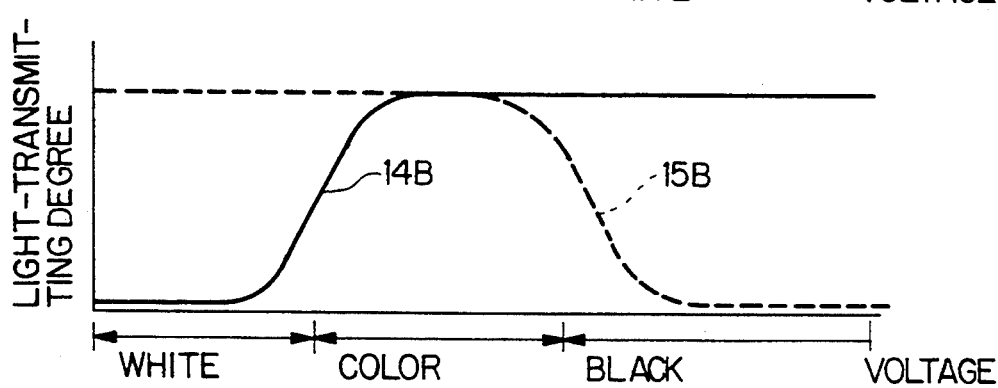
Figure 8C:
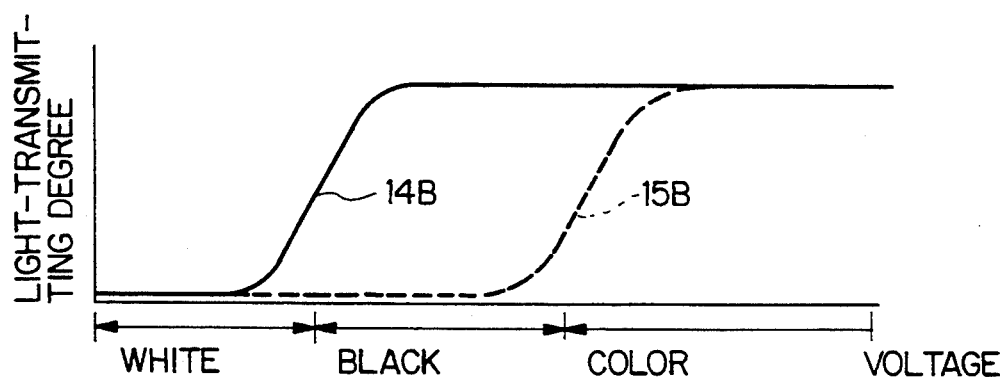
Figure 8D:
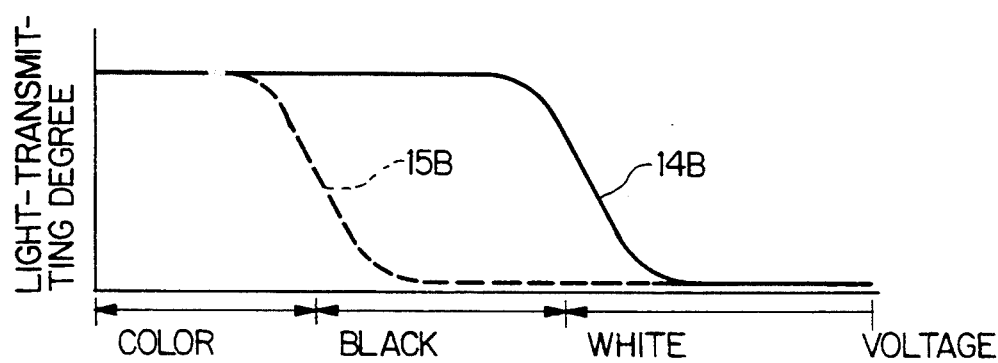

In the embodiment 7, the characteristics shown in FIG. 8B were achieved by using a double-frequency driven liquid crystal for the first dimmer layer 27, thereby providing the first dimmer layer 27 which is transparent when no voltage is applied. In this embodiment, the characteristics of FIG. 8B in which the second dimmer layer 29 is in a light-transmitting state when no voltage is applied are achieved by using a double frequency driven liquid crystal for the second dimmer layer 29.

In order to achieve such an optical change in the embodiment, a liquid crystal (E8) which is positive in dielectric constant anisotropy is used to constitute the first dimmer layer 27 and, as the high-molecular precursor, the monomer (2-ethyl hexyl acrylate) and the oligomer (UN-9000PEP) were mixed at a ratio of 1:2. A mixture composed of 35 wt. % of the resulting ultraviolet setting resin and 65 wt. % of a liquid crystal were mixed to bring about setting by illumination by ultraviolet rays to obtain the first dimmer layer 27. In addition, a guest-host liquid crystal was used in which 0.4 wt. % of an azoic pigment was added to a double-frequency driven liquid crystal (commercially available from Chisso Inc. $n_0=1.509$, $\Delta n=0.154$). A mixture of the monomer and the oligomer at a ratio of 1:1 was used as the high-molecular precursor. A voltage of 50 V at a low frequency of 100 Hz was applied during formation of the second dimmer layer 29 by illumination of ultraviolet rays, whereby the liquid crystal molecules were oriented perpendicular to the substrate in their initial state. By arranging the first and second dimmer layers 27 and 29 as described above, the light-transmitting characteristics shown in FIG. 8B were obtained. With the second liquid crystal 29 of this embodiment arranged in this embodiment, the crossover frequency ($\epsilon_\perp = \epsilon_\parallel$) is 10 kHz, and at frequencies above this value, $\Delta\epsilon < 0$. Therefore, the liquid crystal element will display white when no voltage was applied, and when driven by a high-frequency (100 kHz) voltage, the second dimmer layer 29 will begin to change from a light-absorbing state to a light-transmitting state when the voltage exceeds 6 V, and will become transparent at 10 V. At this time, since the first dimmer layer 27 is still transparent, color will be displayed. If the applied voltage is further increased, the first dimmer layer 27 will begin to change from a transparent state to a light-scattering state at 25 V and will become completely light-scattering at 45 V, causing black to be displayed. As described above, this embodiment enables both monochrome and color displays of excellent contrast within the same pixel.

Embodiment 9

In the embodiments 7 and 8, a double-frequency driven liquid crystal was used for the liquid crystal constituting the polymer dispersed liquid crystal layer, resulting in a first dimmer layer 27 which is transparent when no voltage is applied and enters a light-scattering state when voltage is applied. In this embodiment, a liquid crystal having an aromatic ring within its basic structure and which is negative in $\Delta\epsilon$ was used to impart its initial orientation by a magnetic field, and as a result, the first dimmer layer 27 is transparent when no voltage is applied and becomes light-scattering when voltage is applied.

In order to achieve such an optical change, a liquid crystal negative in $\Delta\epsilon$ ($n_0 = 1.509$, $\Delta_n = 0.154$, $\Delta\epsilon = -3.1$) was used as the liquid crystal component constituting the first dimmer layer 27, and a mixture of the monomer (2-ethylhexyl acrylate) and the oligomer (UN=9000PEP) at a ratio of 1:1 was used as the high molecular precursor. When the solution composed of 35 (wt. %) of this high-molecular precursor and 65 (wt. %) of the liquid crystal is illuminated by ultraviolet rays, a magnetic field of 10 kG, a value sufficiently greater than the Fredericks transition point of the illuminated liquid crystal, is applied in order to set the mixed solution so that the liquid crystal molecules are oriented perpendicular to the substrate in their initial state, and in this way, the first dimmer layer 27 is formed. In addition, the monomer and oligomer are mixed at a ratio of 1:2, and a mixture composed of 35 (wt. %) of the resulting ultraviolet setting resin and 65 (wt. %) of a liquid crystal (a guest-host liquid crystal obtained by adding 0.4 (wt. %) of an azoic pigment to E8) was prepared and illuminated by ultraviolet rays to set and complete the second dimmer layer 29. By forming the first and second dimmer layers 27 and 29 as described above, the light-transmitting characteristics shown in FIG. 8A can be obtained. The color display element in this embodiment displays black when no voltage is applied. The second dimmer layer 29 will begin to change from a light-absorbing state to a light-transmitting state when the voltage is increased and exceeds 6 V and will become transparent at 10 V. At this time, since the first dimmer layer 27 is still transparent, the element will display color. If the voltage is further increased, the first dimmer layer 27 will begin to change from a transparent state to a light-scattering state at 30 V and will become completely light-scattering at 52 V, causing white to be displayed. As described above, this embodiment enables both monochrome and color displays of excellent contrast within the same pixel.

Embodiment 10

In the embodiment 9, it is possible to realize the characteristics shown in FIG. 8B by using the normal type for the first dimmer layer 27 and the reverse type for the second dimmer layer 29. A similar relation is seen between the embodiments 8 and 7.

In this embodiment, a liquid crystal (E8) positive in dielectric constant anisotropy was used to arrange the first dimmer layer 27 as a normally responsive PDLC and a mixture of a monomer (2-ethylhexyl acrylate) and an oligomer (UN-9000PEP) at a ratio of 1:2 was used as the high-molecular precursor. A mixture made up of 35 (wt. %) of the resulting ultraviolet setting resin and 65 (wt. %) of the liquid crystal was prepared and illuminated by ultraviolet rays to set and obtain the first dimmer layer 27. A guest-host liquid crystal composed of a liquid crystal negative in $\Delta\epsilon$ ($n_0 = 1.509$, $\Delta_n = 0.154$, $\Delta\epsilon - 3.1$) and 0.4 (wt. %) of an azoic pigment was used for the second dimmer layer 29 and, as the high molecular precursor, a mixture of the monomer and the oligomer at a ratio of 1:1 was used. When the solution made up of 35 (wt. %) of this precursor and 65 (wt. %) of the liquid crystal at a ratio of 1:1 was illuminated by ultraviolet rays, a magnetic field of 10 kG, a value greater than the Fredericks transition point of the liquid crystal, was imparted to set the mixed solution such that the liquid crystal molecules were oriented perpendicular to the substrate in their initial state, and in this way the second reversely responsive dimmer layer 29 was formed.

As described above, by arranging the normally responsive first dimmer layer 27 and the reversely responsive second dimmer layer 29, the light-transmitting characteristics shown in FIG. 8B were achieved. The color display elements of this embodiment displays white when no voltage is applied. If the voltage is increased, the first dimmer layer 27 will begin to change from a light-scattering state to a transparent state at 6 V and will become transparent at 10 V. Since the second dimmer layer 29 is still transparent, color will be displayed. If the applied voltage is further increased, the second dimmer layer 29 will begin to change from a transparent state to a light-scattering state at 30 V and will become completely light-scattering at 52 V, causing white to be displayed. As described above, this embodiment also enables monochrome and color displays of excellent contrast within the same pixel.

Figure 7B:
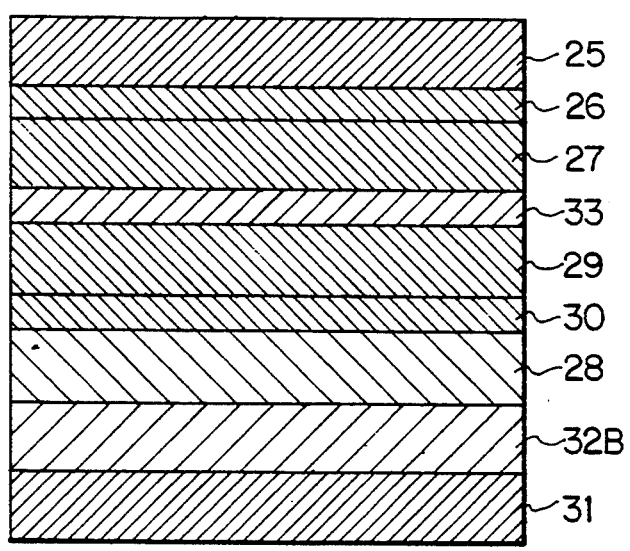

Although the color filter 28 was disposed between the first and second dimmer layers 27 and 29 in the foregoing embodiments 6 through 10, in these embodiment it is also possible to dispose the color filter 28 of FIG. 7B between the second dimmer layer 29 and the light-reflecting layer 32B, as in embodiment 5. In this case, since the color filter 28 can be formed immediately above the light-reflecting layer 32B, a light-reflecting layer 32B composed of metal was arranged on the substrate 32, and the color filter 28 was applied to this layer by a printing or electroplating method. A transparent electrode 30 composed of an ITO was then formed by a sputtering method in order to prevent the drop of the electric field, caused by color filter 28 to form the second dimmer layer 29 on the transparent electrode 30. However, if such an arrangement is adopted, the first and second dimmer layers 27 and 29 will come in direct contact with each other, and, if the liquid crystal components constituting the first and second dimmer layers 27 and 29 are different, care must be taken that the liquid crystals of these two layers 27, 29 are not mixed together. Therefore, in order to prevent the mixture of the components of the first and second dimmer layers 27 and 28 in this embodiment, a polyimide film was formed by a spin coating method to form an interlayer separating film 33. Although a polyimide spin coating film was used as the film 33 in this embodiment, in view of the fact that this film 33 is only intended for preventing the mixture of the liquid crystals of the first and second dimmer layers 27 and 29, it is naturally possible to use other materials that are transparent to visible light, for example, glass, polymer or the like.

Embodiment 11

Figure 11A:
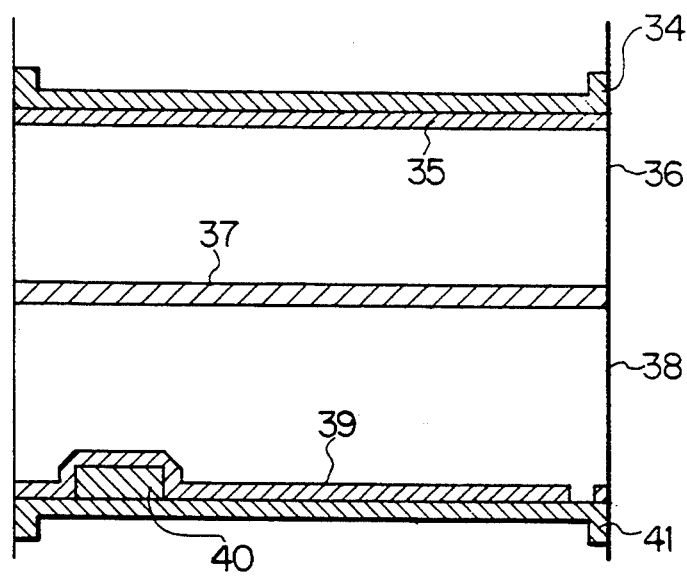
FIGS. 11A and 11B are cross-sectional views of a color display element according to another embodiment of the present invention.
Figure 11B:
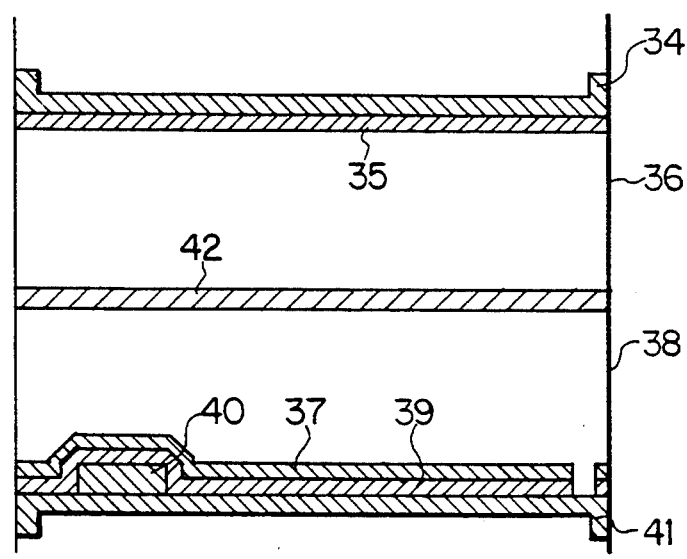

Although voltage was applied to the liquid crystal element in a static or time-dividing manner in embodiments 5 through 8, it is also possible to drive the liquid crystal element of the present invention by an active element. FIGS. 11A and 11B is a cross-sectional view of a liquid crystal element according to the present embodiment in which an active element is added for each pixel. In this embodiment, the light-reflecting layer 32B was made of silver (or aluminum, chrome or other metal) to integrate with the transparent electrode 30.

The liquid crystal element shown in FIG. 11A is formed in the following manner. First, a switching element TFT40 is formed on a glass substrate 41, and a pixel electrode 39 is formed so as to cover this element TFT40. Although TFT40 and the pixel electrode 39 are completely separate in a light-transmitting display, since the liquid crystal element of the present invention is a reflecting display, it is possible to dispose the pixel electrode 39 so as to cover TFT40. As a result, the operation area relative to a single pixel area differs from that of a light-transmitting display by about 40%, and it is possible to achieve a very large (more than 80%) aperture area compared with a light-transmitting display. On the glass substrate 41 upon which the pixel electrode 39 and TFT40 are formed, a mixture made up of 35 (wt. %) of an ultraviolet setting resin composed of a monomer and an oligomer at a ratio of 1:2 and 65 (wt. %) of a liquid crystal (a guest-host liquid crystal composed of 0.4 (wt. %) of an azoic pigment and E8) is illuminated by ultraviolet rays to set and form the second dimmer layer 38. A color filter 37 was then formed on this second dimmer layer 38. A liquid crystal negative in $\Delta \epsilon$ of the component constituting the first dimmer layer 36 ($n_0=1.509$, $\Delta_n=0.154$, $\Delta \epsilon=-3.1$) was used and, as the high molecular precursor, a mixture of a monomer (2-ethylhexyl acrylate) and an oligomer (UN=90000PEP) at a ratio of 1:1 was used. A solution of 35 (wt. %) of this high-molecular precursor and 65 (wt. %) of the liquid crystal was deposited on the color filter 37 by a screen printing method, as in the second dimmer layer 38. After a glass substrate 34 attached with an opposed electrode 35 was applied to prevent the solution air to enter, a magnetic field (10 kG), which is sufficiently greater than the Fredericks transition point of the liquid crystal, was applied and the assembly was illuminated by ultraviolet rays to set the mixed solution. The first dimmer layer 36 was formed to obtain the liquid crystal element in such a way that the liquid crystal molecules were oriented perpendicular to the substrate in their initial state. Although the component of the first and second dimmer layers 27 and 38 used in this embodiment is the same as the component of embodiment 8, the operating voltage and the display form are the same as in the embodiment 8.

In this embodiment, an active matrix liquid crystal element was realized by adding an active element to a liquid crystal element having the element arrangement of the embodiment 8. However, it is obvious that all liquid crystal elements having the arrangement of the present invention will allow driving by an active matrix by adding the active element.

Although the color filter 37 in this embodiment is disposed between the first and second dimmer layers 36 and 38, it is also possible to dispose the color filter 37 between the second dimmer layer 38 and the pixel electrode 39, which also serves as the light-reflecting layer, as illustrated in FIG. 11B and as in embodiments 5 through 10.

In the foregoing embodiments, in the color filter 37, the overall liquid crystal panel may be the same, the color may be changed for each pixel, or the color may be partially changed.

In the foregoing embodiments, 2-ethylhexyl acrylate was used as the polymerizing monomer, UP-9000PEP of the urethane acrylate oligomer series was used as the polymerizing oligomer, and benzophenone was used as the ultraviolet setting initiating material. However, other combinations are possible. As the polymerizing monomer, an acryl series monomer such as methylacrylate, 2-ethylhexyl melacrylate, cyclohexyl acrylate, butadiol monoacrylate or the like may be used. As the polymerizing oligomer, the epoxy acrylate oligomer series may be used and, as the material for initiating ultraviolet setting, substances of the acetaphenone series, benzoin series, benzophenone series or thioxanthene series may be used, as well as materials of other series.

While the preferred embodiments of the invention have been described in specific terms, this description is for the illustrative purpose only, and it is to be understood that various changes and modifications may be made without departing from the scope and spirit of the following claims.

What is claimed is:

1. A color display element comprising the following components arranged in the following order: a first substrate, a first electrode, a first dimmer layer having light-scattering and transparent states which are controlled by an external electric field, a color filter, a second dimmer layer having light-scattering and transparent states which are controlled by an external electric field, a second electrode, and a second substrate; each of said components being provided in the above order as viewed from the side from which light enters; and a light-absorbing layer being provided behind said second dimmer layer, as viewed from the light entering side, to absorb the light which passes through said first substrate, first electrode, color filter and second dimmer layer.

2. A color display element as set forth in claim 1 wherein at least one of said first and second dimmer layers comprises a layer containing a liquid crystal material dispersed within a photo-setting compound.

3. A color display element as set forth in claim 1 wherein at least one of said first and second dimmer layers is transparent to light when no voltage is applied and enters a light-scattering state when voltage above a predetermined threshold value is applied.

4. A color display element as set forth in claim 2 wherein at least one of said first and second dimmer layers comprises a layer containing a liquid crystal material, which can take at least a value negative in dielectric constant anisotropy, within a photo-setting compound; and wherein an interface between said liquid crystal material and said photo-setting compound has a predetermined state of orientation.

5. A color display element as set forth in claim 4 wherein illumination by light is used to set a mixed solution of said liquid crystal material and said photo-setting compound, with an electric field, a magnetic field or both applied thereto to set and form the dimmer layer.

6. A color display element as set forth in claim 1 wherein said first and second dimmer layers lie immediately above and below said color filter.

7. A color display element as set forth in claim 1 wherein a pair of said first and second substrates, on the surface of which transparent electrodes composed of an ITO are formed, is used.

8. A color display element as set forth in claim 1 wherein a double frequency driven liquid crystal is used for a liquid crystal component of said second dimmer layer.

9. A color display element as set forth in claim 2 wherein said liquid crystal material is provided with an aromatic ring within its basic skeleton and is negative in dielectric constant anisotropy.

10. The color display element as set forth in claim 1 wherein: said element displays black when said first and second dimmer layers are both driven to the transparent state; said element displays color when said first dimmer layer is transparent and said second dimmer layer is in a light-scattering state and said element displays white when said first dimmer layer is in a light-scattering state.

11. A color display element comprising the following components arranged in the following order: a first substrate, a first electrode, a first dimmer layer having light-scattering and transparent states which are controlled by an external electric field, a second dimmer layer having light-absorbing and transparent states which are controlled by an external electric field, a second electrode and a second substrate disposed in the above order as viewed from a side from which light enters, a light-reflecting layer being provided behind said second dimmer layer, and adjacent to said second substrate, as viewed from the side from which light enters, to reflect the light which passes through said first and second dimmer layers, and a color filter disposed between said first dimmer layer and said second dimmer layer.

12. A color display element as set forth in claim 11 wherein a dichroism pigment is dispersed within said second dimmer layer.

13. A color display element as set forth claim 11 wherein at least one of said first and second dimmer layers comprises a layer containing a liquid crystal material dispersed within a photo-setting compound.

14. A color display element as set forth in claim 11 wherein at least one of said first and second dimmer layers transmits light when no voltage is applied, and when voltage above a predetermined threshold value is applied, said first dimmer layer scatters light and said second dimmer layer absorbs light.

15. A color display element as set forth claim 13 wherein at least one of said first and second dimmer layers comprises a layer containing a liquid crystal material which can take at least a value negative in dielectric constant anisotropy within a photo-setting compound, and wherein the interface between said liquid crystal material and said photo-setting compound has a predetermined state of orientation.

16. A color display element as set forth in claim 15 wherein illumination by light is used to set a mixed solution of said liquid crystal material and said photo-setting compound, with an electric field, a magnetic field or both applied thereto to set and form the dimmer layer.

17. A color display element as set forth in claim 11 wherein said first and second dimmer layers lie immediately above and below said color filter.

18. A color display element as set forth in claim 11 wherein a pair of of said first and second substrates, on the surface of which transparent electrodes composed of an ITO are formed, is used.

19. A color display element as set forth in claim 11 wherein a double frequency driven liquid crystal is used for a liquid crystal component of said first or second dimmer layer.

20. A color display element as set forth claim 13 wherein said liquid crystal material is provided with an aromatic ring within its basic skeleton and is negative in dielectric constant anisotropy.

21. A color display element as set forth in claim 11 wherein said first dimmer layer is a normally responsive type and said second dimmer layer is a reversely responsive type.

22. A color display element as set forth in any one of claims 11–19, comprising liquid crystal elements driven by an active element.

23. The color display element as set forth in claim 11 wherein; the element displays black when said first dimmer layer is transparent and said second dimmer layer is in a light-absorbing state; said element displays color when said first and second dimmer layers are both transparent; and said element displays white when said first dimmer layer is in a light-scattering state.

* * * * *

UNITED STATES PATENT AND TRADEMARK OFFICE
CERTIFICATE OF CORRECTION

PATENT NO.   : 5,452,113
DATED        : September 19, 1995
INVENTOR(S)  : Hidenori IKENO It is certified that error(s) appears in the above-identified patent and that said Letters Patent is hereby corrected as shown below:

Col. 7, line 68, delete "Acan", insert --$\Delta \epsilon$--.

Signed and Sealed this

Eleventh Day of June, 1996

Attest:

BRUCE LEHMAN

*Attesting Officer*     Commissioner of Patents and Trademarks